United States Patent
Nishina et al.

(10) Patent No.: US 7,178,158 B2
(45) Date of Patent: Feb. 13, 2007

(54) TRANSMITTER SYSTEM AND TRANSMITTING METHOD, RECEIVER SYSTEM AND RECEIVING METHOD AND TRANSMISSION MEDIA

(75) Inventors: Yasutomo Nishina, Chiba (JP); Tomoyuki Hanai, Kanagawa (JP); Tomoko Terakado, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/116,124

(22) Filed: Jul. 15, 1998

(65) Prior Publication Data
US 2002/0078451 A1    Jun. 20, 2002

(30) Foreign Application Priority Data
Jul. 18, 1997    (JP)    ................................. 9-193725

(51) Int. Cl.
*H04N 5/445*    (2006.01)
*G06F 3/00*    (2006.01)

(52) U.S. Cl. ............................. 725/43; 725/39; 725/47; 725/49

(58) Field of Classification Search ................ 345/327, 345/12, 473, 505, 724; 348/906, 474, 564; 725/37–44, 47–48, 67–68, 52, 32, 35, 116, 725/134, 144, 151; 715/513, 516, 517, 522, 715/526
See application file for complete search history.

(56) References Cited

U.S. PATENT DOCUMENTS

| | | | | | |
|---|---|---|---|---|---|
| 5,675,752 | A | * | 10/1997 | Scott et al. ................. | 395/333 |
| 5,795,228 | A | * | 8/1998 | Trumbull et al. ............. | 463/42 |
| 5,850,218 | A | * | 12/1998 | LaJoie et al. ................ | 345/327 |
| 5,982,445 | A | * | 11/1999 | Eyer et al. .................. | 348/461 |
| 6,005,562 | A | * | 12/1999 | Shiga et al. ................. | 345/327 |
| 6,011,546 | A | * | 1/2000 | Bertram ...................... | 345/327 |
| 6,025,837 | A | * | 2/2000 | Matthews, III et al. ...... | 345/327 |
| 6,502,241 | B1 | * | 12/2002 | Kretz et al. .................... | 725/52 |

* cited by examiner

*Primary Examiner*—Hai Tran
(74) *Attorney, Agent, or Firm*—Frommer Lawrence & Haug LLP; William S. Frommer; Thomas F. Presson

(57) ABSTRACT

There is provided a system which allows information related to a broadcasting program to be processed efficiently. The program related information related to the certain program created on the transmitter side is composed of Event Data, Channel Data, Character Data, CM data and the like and is converted into EPG_contents_data. Further, display related information concerning on a layout and the like in displaying the program related information created on the transmitter side on a screen is composed of Layout Data, Color Data, Font Data and Operation Data and is converted into EPG_control_data. The receiver side generates EPG_management_data as necessary from the EPG_contents_data and the EPG_control_data transmitted from the transmitter side and generates EPG_display_data which is display information from the EPG_contents_data and the EPG_control_data.

10 Claims, 35 Drawing Sheets

FIG.16

| epg_data | element | description |
|---|---|---|
| epg_contents_data | event_data_element | element Describing Information on Broadcasting Program |
| | channel_data_element | element Describing Information on Broadcasting Station |
| | character_data_element | element Describing Information on Characters |
| | material_data_element | element Describing Information on Material |
| | company_data_element | element Describing Information on Company |
| | text_data_element | element Describing Information on Text |
| | picture_data_element | element Describing Information on Picture |
| | sound_data_element | element Describing Information on Sound |
| | movie_data_element | element Describing Information on Movie |
| | CM_data_element | element Describing Information Related to CM |
| epg_control_data | main_layout_element | element Describing Main Information on Browser Layout |
| | box_layout_element | element Describing Box Information on Browser Layout |
| | cell_layout_element | element Describing Cell Information on Browser Layout |
| | main_operation_element | element Describing Main Information on Browser Control |
| | box_operation_element | element Describing Box Information on Browser Control |
| | cell_operation_element | element Describing Cell Information on Browser Control |
| epg_management_data | main_management_element | element Describing Main Information on Browser Management |
| | box_management_element | element Describing Box Information on Browser Management |
| | cell_management_element | element Describing Cell Information on Browser Management |
| | list_management_element | element Describing Information on Program List |
| epg_display_data | ★ | Browser Display Information |

FIG.22

| element_block_kind | element_block_data |
|---|---|
| ID | Identification No. Allocated to element_block |
| value | Numerical Value |
| text | Character String |
| picture | Picture |
| sound | Sound |
| movie | Movie |
| time | Time |

FIG.23

⟨element_tag⟩ ··· ⟨event_data_tag⟩

| [element_block_label] | element_block_data | element_block_kind | data |
|---|---|---|---|
| event_no_label | event_no | ID | ID Allocated in Unit of Program |
| onAir_time_label | onAir_time | time | Program Starting Date/Time |
| duration_label | duration | time | Program Broadcasting Duration |
| onAir_channel_label | channel_no | ID | channel_no of Channel in Which Program is Broadcasted |
| category_label | category_no | ID | category_no of Program Category |
| program Type_label | Program_type | ID | type_no of Program Type |
| main_title_label | main_title | text | Main Title of Program |
| sub_title_label | sub_title | text | Sub-Title of Program |
| 1st_detail_label | 1st_detail | text | Contents of Program |
| 2nd_detail_label | 2nd_detail | text | (Detail) Contents of Program |
| relational_character_label | character_no | ID | character_no of Character in Program |
| relational_picture_label | picture_no | ID | picture_no of Picture Related to Program |
| relational_sound_label | sound_no | ID | sound_no of Sound Related to Program |
| relational_movie_label | movie_no | ID | movie_no of Movie Related to Program |
| relational_company_label | company_no | ID | company_no of Company Related to Program |

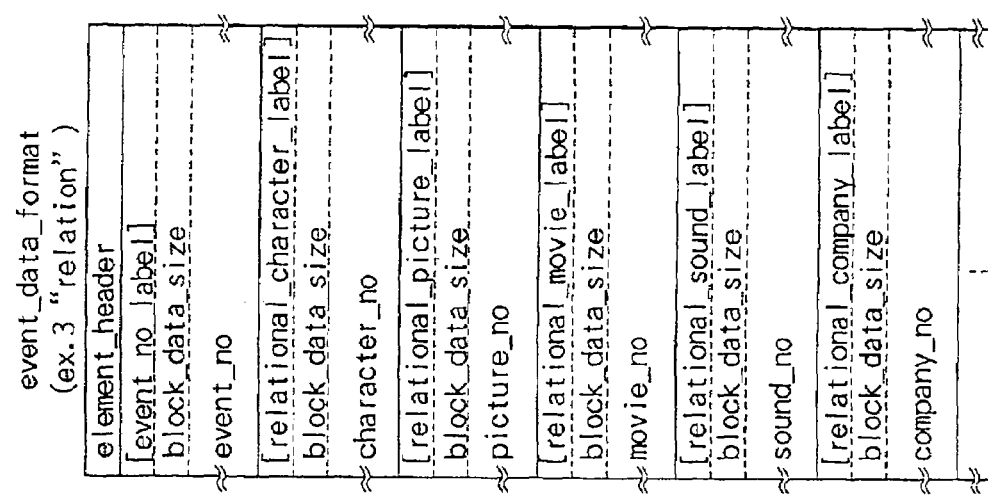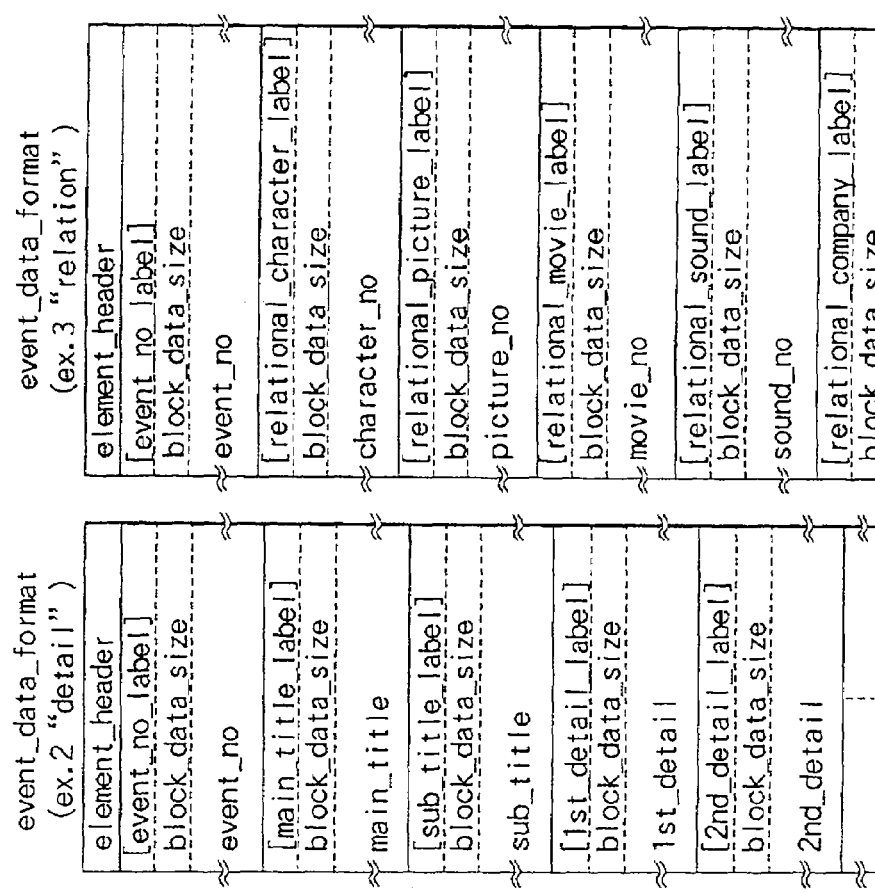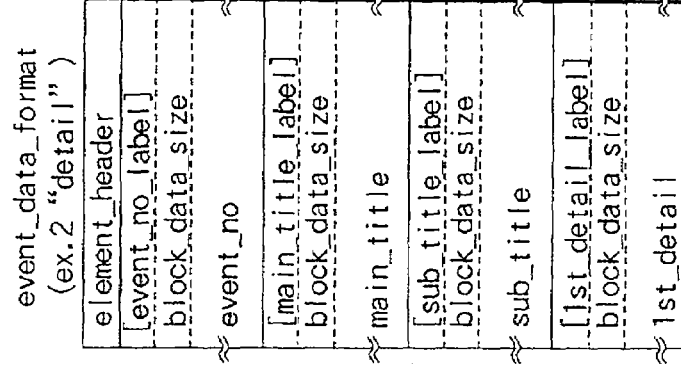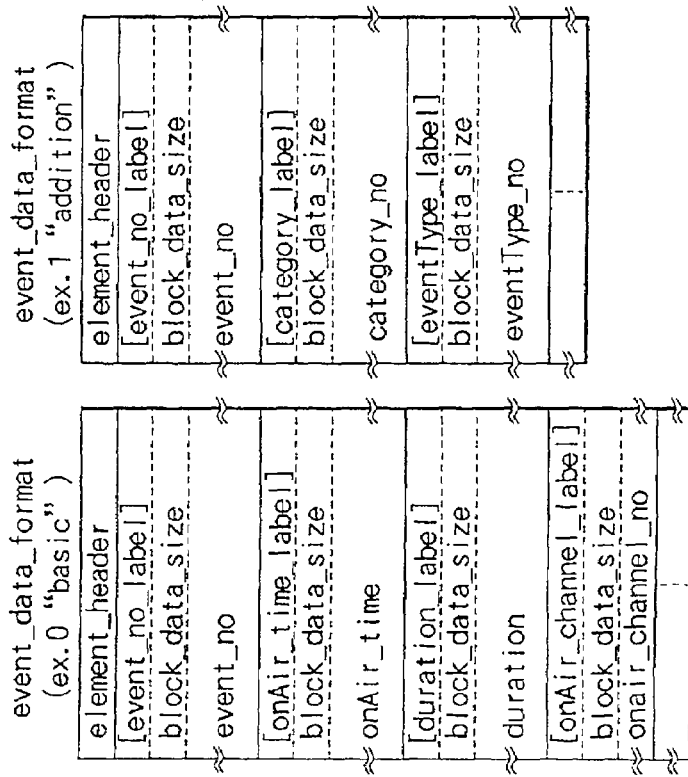

FIG.25

⟨element_tag⟩···⟨channel_data_tag⟩

| [element_block_label] | element_block_data | element_block_kind | data |
|---|---|---|---|
| channel_no_label | channel_no | ID | ID Allocated in Unit of Channel |
| station_name_label | station_name | text | Name of Broadcasting Station |
| station_Icon_label | station_Icon | pict | station_Icon of Broadcasting Station |
| relational_picture_label | picture_no | ID | picture_no of Picture Related to Broadcasting Station |
| relational_sound_label | sound_no | ID | sound_no of Sound Related to Broadcasting Station |
| relational_movie_label | movie_no | ID | movie_no of Movie Related to Broadcasting Station |
| channel_company_label | company_no | ID | company_no of Company Related to Broadcasting Station |

FIG.27

⟨element_tag⟩...⟨character_data_tag⟩

| [element_block_label] | element_block_data | element_block_kind | data |
|---|---|---|---|
| channel_no_label | character_no | ID | ID Allocated in Unit of Character |
| character_name_label | character_name | text | Name of Character |
| character_age_label | character_age | volue | Age |
| character_profile_label | character_profile | text | Profile |
| relational_character_label | character_no | ID | character_no of Character Related to Character |
| relational_picture_label | picture_no | ID | picture_no of Picture Related to Character |
| relational_sound_label | sound_no | ID | sound_no of Sound Related to Character |
| relational_movie_label | movie_no | ID | movie_no of Movie Related to Character |

FIG.28A
FIG.28B
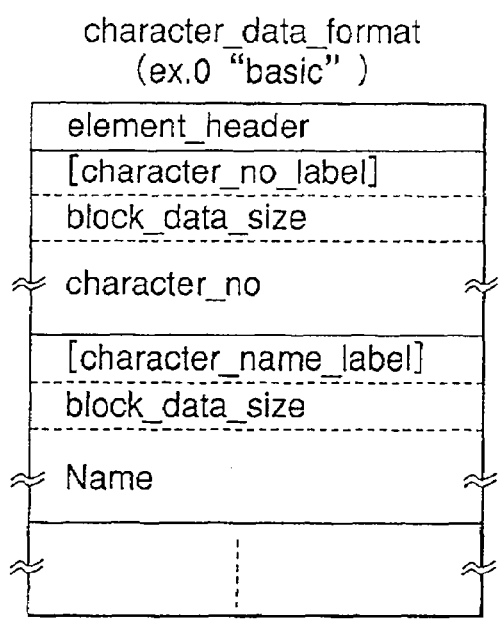
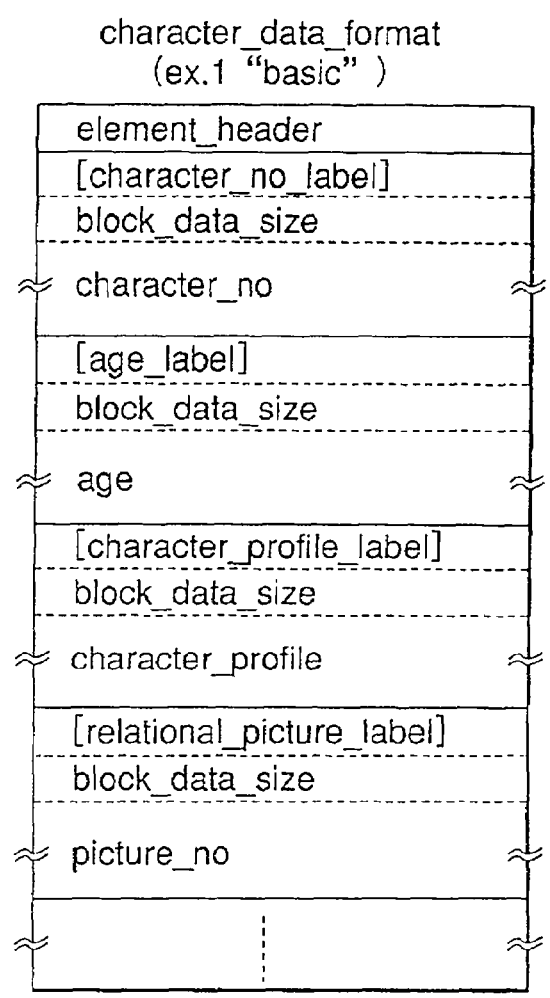

FIG.29

`<element_tag>...<text_data_tag>`

| [element_block_label] | element_block_data | element_block_kind | data |
|---|---|---|---|
| text_no_label | text_no | ID | ID Allocated in Unit of Text |
| text_name_label | text_name | text | Name of Text |
| text_format | text_format_no | ID | Format ID of Text |
| relational_program_label | program_no | ID | program_no of Program Related to Text |
| relational_character_label | character_no | ID | character_no of Character Related to Text |
| relational_picture_label | picture_no | ID | picture_no of Picture Related to Text |
| relational_sound_label | sound_no | ID | sound_no of Sound Related to Text |
| relational_movie_label | movie_no | ID | movie_no of Movie Related to Text |

FIG.30

⟨element_tag⟩⋯⟨picture_data_tag⟩

| [element_tag] | element_block_data | element_block_kind | data |
|---|---|---|---|
| picture_no_label | picture_no | ID | ID Allocated in Unit of Picture |
| picture_name_label | picture_name | text | Name of Picture |
| picture_format | picture_format_no | ID | Format ID of Picture |
| relational_program_label | program_no | ID | program_no of Program Related to Picture |
| relational_character_label | character_no | ID | character_no of Character Related to Picture |
| relational_picture_label | picture_no | ID | picture_no of Picture Related to Picture |
| relational_sound_label | sound_no | ID | sound_no of Sound Related to Picture |
| relational_movie_label | movie_no | ID | movie_no of Movie Related to Picture |

FIG.31

⟨element_tag⟩ ... ⟨sound_data_tag⟩

| [element_block_label] | element_block_data | element_block_kind | data |
|---|---|---|---|
| sound_no_label | sound_no | ID | ID Allocated in Unit of Sound |
| sound_name_label | sound_name | text | Name of Sound |
| sound_format | sound_format_no | ID | Format ID of Sound |
| relational_program_label | program_no | ID | program_no of Program Related to Sound |
| relational_character_label | character_no | ID | character_no of Character Related to Sound |
| relational_picture_label | picture_no | ID | picture_no of Picture Related to Sound |
| relational_sound_label | sound_no | ID | sound_no of Sound Related to Sound |
| relational_movie_label | movie_no | ID | movie_no of Movie Related to Sound |

FIG.32

⟨element_tag⟩...⟨movie_data_tag⟩

| [element_block_label] | element_block_data | element_block_kind | data |
|---|---|---|---|
| movie_no_label | movie_no | ID | ID Allocated in Unit of Movie |
| movie_name_label | movie_name | text | Name of Movie |
| movie_format | movie_format_no | ID | Format ID of Movie |
| relational_program_label | program_no | ID | Porogram_no of Program Related to Movie |
| relational_character_label | character_no | ID | character_no of Character Related to Movie |
| relational_picture_label | picture_no | ID | picture_no of Picture Related to Movie |
| relational_sound_label | sound_no | ID | sound_no of Sound Related to Movie |
| relational_movie_label | movie_no | ID | movie_no of Movie Related to Movie |

FIG.34A
⟨element_tag⟩···⟨main_layout_tag⟩

| [element_block_label] | element_block_data | element_block_kind | data |
|---|---|---|---|
| page_no_label | page_no | ID | ID Allocated in Unit of Page to be Displayed |
| page_name_label | page_name | text | Name of Page |
| page_position_label | page_position | value | Page Display Position |
| compose_box_label | box_no | ID | box_no of Box Composing Page |

FIG.34B
⟨element_tag⟩···⟨box_layout_tag⟩

| [element_block_label] | element_block_data | element_block_kind | data |
|---|---|---|---|
| box_no_label | box_no | ID | ID Allocated in Unit of Box |
| box_name_label | box_name | text | Name of Box |
| box_position_label | box_position | value | Box Display Position |
| compose_cell_label | cell_no | ID | cell_no of Cell Composing Box |

FIG.34C
⟨element_tag⟩···⟨cell_layout_tag⟩

| [element_block_label] | element_block_data | element_block_kind | data |
|---|---|---|---|
| cell_no_label | cell_no | ID | ID Allocated in Unit of Cell |
| cell_name_label | cell_name | text | Name of Cell |
| cell_position_label | cell_position | value | Cell Display Position |
| relational_program_no_label | program_no | ID | program_no of Program Related to Cell |
| relational_channel_no_label | channel_no | ID | channel_no of Channel Related to Cell |
| relational_character_no_label | character_no | ID | character_no of character Related to Cell |
| relational_material_no | material_no | ID | material_no of Material Related to Cell |

| element | block | description |
|---|---|---|
| event_data_element | | Describe Information on Broadcasting Program |
| | event_no_block | ID Allocated in Unit of Program |
| | onAir_time_block | Program Starting Date/Time |
| | duration_block | Program Broadcasting Duration |
| | onAir_channel_block | channel_no of Channel in Which Program is Broadcasted |
| | category_block | category_no of Program Category |
| | eventType_block | type_no of Program Type |
| | main_title_block | Main Title of Program |
| | sub_title_block | Sub-Title of Program |
| | 1st_detail_block | Contents of Program |
| | 2nd_detail_block | (Detail) Contents of Program |
| | relational_program_no_block | program_no of Related Program |
| | relational_character_block | character_no of Related Character (Cast) |
| | relational_material_block | material_no of Related Material |
| | relational_company_block | company_no of Related Company (Sponsor) |
| | relational_text_block | text_no of Related Text |
| | relational_picture_block | picture_no of Related Picture |
| | relational_sound_block | sound_no of Related Sound |
| | relational_movie_block | movie_no of Related Movie |
| channel_data_element | | Describe Information on Broadcasting Station |
| | channel_no_block | ID Allocated in Unit of Channel |
| | station_name_block | Name of Broadcasting Station |
| | station_icon_block | station_icon of Broadcasting Station |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |
| character_data_element | | Describe Information on Character |
| | character_no_block | ID Allocated in Unit of Character |
| | character_name_block | Name of Character |
| | character_age_block | Age |
| | character_profile_block | Profile |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |

FIG.36
(35-2)

| element | block | description |
|---|---|---|
| material_data_element | | Describe Information on Material |
| | material_no_block | ID Allocated in Unit of Material |
| | material_name_block | Name of Material |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |
| company_data_element | | Describe Information on Company |
| | company_no_block | ID Allocated in Unit of Company |
| | company_name_block | Name of Company |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |
| text_data_element | | Describe Information on Text |
| | text_no_block | ID Allocated in Unit of Text |
| | text_name_block | Name of Text |
| | text_format_block | Format ID of Text |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |
| picture_data_element | | Describe Information on Picture |
| | picture_no_block | ID Allocated in Unit of Picture |
| | picture_name_block | Name of Picture |
| | picture_format_block | Format ID of Picture |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |

| element | block | description |
|---|---|---|
| sound_data_element | | Describe Information on Sound |
| | sound_no_block | ID Allocated in Unit of Sound |
| | sound_name_block | Name of Sound |
| | sound_format_block | Format ID of Sound |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |
| movie_data_element | | Describe Information on Movie |
| | movie_no_block | ID Allocated in Unit of Movie |
| | movie_name_block | Name of Movie |
| | movie_format | Format ID of Movie |
| | relational_program_no_block | program_no of Related Program |
| | relational_character_block | character_no of Related Character |
| | relational_material_block | material_no of Related Material |
| | relational_company_block | company_no of Related Company |
| | relational_text_block | text_no of Related Text |
| | relational_picture_block | picture_no of Related Picture |
| | relational_sound_block | sound_no of Related Sound |
| | relational_movie_block | movie_no of Related Movie |

FIG.38

| element | block | description |
|---|---|---|
| main_layout_element | | Describe Information on Main Screen |
| | page_no_block | ID Allocated in Unit of Page to be Displayed |
| | page_name_block | Name of Page |
| | page_position_block | Page Display Position |
| | compose_box_block | box_no of Box Composing Page |
| box_layout_element | | Describe Information on Box Screen |
| | box_no_block | ID Allocated in Unit of Box |
| | box_name_block | Name of Box |
| | box_position_block | Box Display Position |
| | compose_cell_block | cell_no of Cell Composing Box |
| cell_layout_element | | Describe Information on Cell Screen |
| | cell_no_block | ID Allocated in Unit of Cell |
| | cell_name_block | Name of Cell |
| | cell_position_block | Cell Display Position |
| | contents_element_block | Type of contents_element to be Displayed in Cell |
| | contents_id_block | ID of contents_element to be Displayed in Cell |
| main_operation_element | | Describe Information for Controlling Main Screen |
| box_operation_element | | Describe Information for Controlling Box Screen |
| cell_operation_element | | Describe Information for Controlling Cell Screen |

FIG.39

| element | block | description |
| --- | --- | --- |
| list_management_element | | Describe Information on Program List |
| | list_no_block | ID Allocated in Unit of Program List |
| | list_time_block | Data of Program List |
| | event_no_block | ID Allocated in Unit of Program |
| | onAir_time_block | Program Starting Date/Time |

TRANSMITTER SYSTEM AND TRANSMITTING METHOD, RECEIVER SYSTEM AND RECEIVING METHOD AND TRANSMISSION MEDIA

BACKGROUND OF THE INVENTION

The present invention relates to a transmitter system and a transmitting method, a receiver system and a receiving method and transmission media and more particularly to a transmitter system and a transmitting method, a receiver system and a receiving method and transmission media which are arranged so as to separately transmit/receive information concerning on contents of a program and information concerning on display and control of the program to be able to process the information efficiently.

The conventional EPG (Electronic Program Guide) system is roughly categorized into two systems of sending program information by adding to digital broadcasting or analog broadcasting to be transmitted and of sending the program information via a transmission path such as Internet different from the route of the broadcasting to be transmitted. The program information is displayed by an application program provided in the receiver side in advance in the former system. Meanwhile, a user is allowed to see the program information by using a predetermined browser in the latter system because the program information is described by a description language such as HTML (Hyper Text Markup Language).

However, the former system allows to handle only information which can be displayed by the limited application of the receiver. Further, it transmits the information giving no consideration to cases of changing display of the information and of displaying the EPG in equipments having different processibility.

Meanwhile, although the latter system provides a high degree of freedom in display because it transmits the information described mainly in the description language such as HTML, it gives no consideration to editing and diversion of the program information. It also has another problem that because it requires transmission information per each screen, an amount of the transmission information increases. In connection with this, the present applicant has proposed a method of hierarchizing information and of transmitting only necessary information in Japanese Patent Application No. Hei. 8-270916.

Thus, the prior art EPG system has had a problem that the transmission of the EPG information is not processed appropriately giving consideration to the case when the same program is broadcasted by different broadcasting stations and different time as often seen in local districts and minor stations.

The prior art EPG system has had another problem that the transmission of the EPG information is not processed appropriately giving consideration to the case when the program is delayed or postponed by some reason.

The prior art EPG system has had a still other problem that the transmission of the EPG information is not processed appropriately giving consideration to the degree of freedom in changing the display format and the layout on the receiver side.

SUMMARY OF THE INVENTION

In view of the above-mentioned problems, the present invention is intended to allow information to be processed efficiently by separately transmitting information and information for displaying or controlling that information.

A transmitter system as described in claim 1 comprises generating means for generating second information and third information concerning on a layout in displaying the second information and transmitting means for transmitting the second information and the third information; wherein the generating means composes the second information and the third information of a first part including identification information for identifying the second information and the third information and a second part composed of actual data.

A receiver system as described in claim 4 comprises receiving means for receiving the second information and the third information concerning on the layout in displaying the second information and generating means for generating fourth information for displaying the second information from the second information and the third information.

A transmitting method as described in claim 8 comprises steps of generating the second information and the third information concerning on the layout in displaying the second information and transmitting the second information and the third information; wherein the generating step composes the second information and the third information of the first part including identification information for identifying the second information and the third information and the second part composed of actual data.

A receiving method as described claim 9 comprises steps of receiving the second information and the third information concerning on the layout in displaying the second information and generating fourth information for displaying the second information from the second information and the third information.

A transmission medium as described in claim 10 transmits a computer program comprising steps of generating the second information and the third information concerning on the layout in displaying the second information and transmitting the second information and the third information; wherein the generating step composes the second information and the third information of the first part including identification information for identifying the second information and the third information and the second part composed of actual data.

A transmission medium as described in claim 11 receives a computer program comprising steps of receiving the second information and the third information concerning on the layout in displaying the second information; and generating fourth information for displaying the second information from the second information and the third information.

In the transmitter system described in claim 1 and the transmitting method described in claim 8, the second information and the third information concerning on the layout in displaying the second information are generated and the second information and the third information are composed of the first part including identification information for identifying the second information and the third information and the second part composed of actual data in transmitting the second information and the third information.

In the receiver system described in claim 4 and the receiving method described in claim 9, the second information and the third information concerning on the layout in displaying the second information are received and the fourth information for displaying the second information is generated from the second information and the third information.

The transmission medium described in claim 10 transmits the computer program generating the second information and third information concerning on the layout in displaying the second information; and composing the second information and the third information of the first part including identification information for identifying the second information and the third information and the second part composed of actual data in transmitting the second information and the third information.

The transmission medium as described in claim 11 transmits the computer program receiving the second information and third information concerning on the layout in displaying the second information and generating fourth information for displaying the second information from the second information and the third information.

The specific nature of the invention, as well as other objects, uses and advantages thereof, will clearly appear from the following description and from the accompanying drawings in which like numerals refer to like parts.

BRIEF DESCRIPTION OF DRAWINGS

FIG. 16 shows an exemplary structure of EPG data;

FIG. 22 is a table showing types of element_block;

FIG. 23 is a table showing event_data_element_blocks;

FIG. 24 is a table showing formats of event_data_element;

FIG. 25 is a table showing channel_data_element_blocks;

FIG. 27 is a table showing character_data_element_blocks;

FIG. 28 is a table showing formats of character_data_element;

FIG. 29 is a table showing text_data_element_blocks;

FIG. 30 is a table showing picture_data_element_blocks;

FIG. 31 is a table showing sound_data_element_blocks;

FIG. 32 is a table showing movie_data_element_blocks;

FIG. 34 is a table showing layout_element_blocks;

FIG. 35 is a table showing EPG_contents_data;

FIG. 36 is a table showing EPG_contents_data;

FIG. 37 is a table showing EPG_contents_data;

FIG. 38 is a table showing EPG_contents_data; and

FIG. 39 is a table showing EPG_management_data.

DESCRIPTION OF PREFERRED EMBODIMENT

Figure 1:
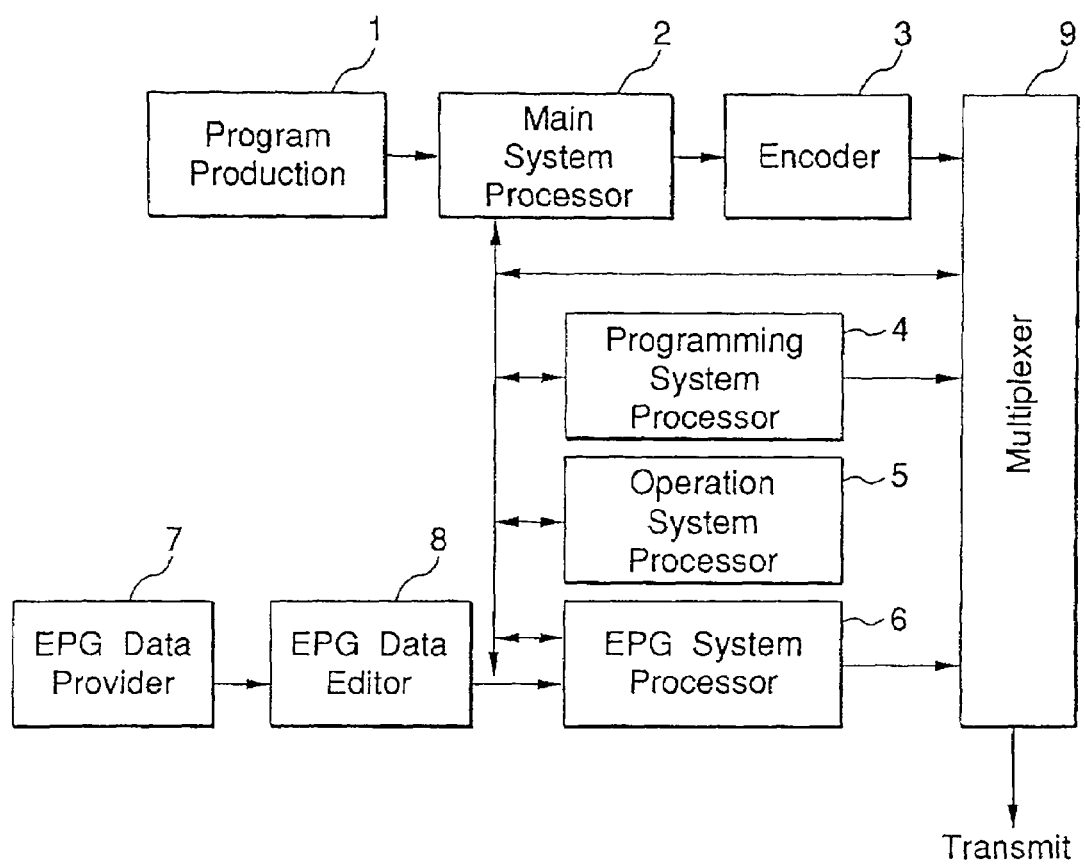
FIG. 1 is a block diagram showing a structural example of one embodiment of a transmitter section of an EPG data management system of a digital TV to which the present invention has been applied.

FIG. 1 is a block diagram showing a structural example of one embodiment of a transmitter section (broadcasting station) of an EPG data management system for a digital TV (television) to which the present invention has been applied. A program production 1 supplies information such as program information and program management information for managing the transmission of the program to a main system processor 2. Among the information supplied from the program production 1, the main system processor 2 supplies video, voice and others to an encoder 3 and the program management information to a programming system processor 4, an operation system processor 5 and an EPG system processor 6 as necessary.

An EPG data provider 7 supplies program guide information to an EPG data editor 8. The EPG data editor 8 manages the information sent from the EPG data provider 7 by categorizing per each type thereof and supplies it to the EPG system processor 6 appropriately as EPG transmitting data. The EPG system processor 6 supplies the information from the EPG data editor 8 to a multiplexer 9. The multiplexer 9 multiplexes the data of video and voice supplied from the encoder 3 and the data such as the program guide information supplied from the EPG system processor 6 and transmits such data to a receiver section.

Figure 2:
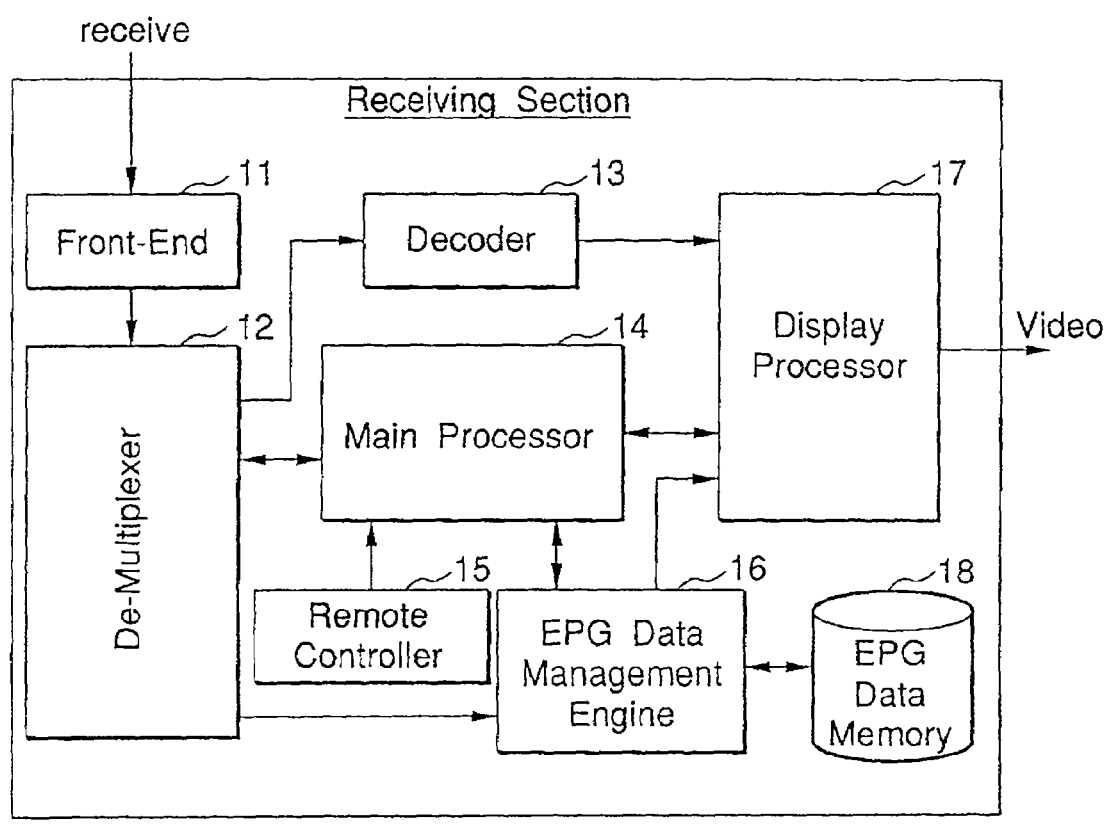
FIG. 2 is a block diagram showing a structural example of one embodiment of a receiver section of the EPG data management system of the digital TV to which the present invention has been applied.

FIG. 2 is a block diagram showing a structural example of one embodiment of the receiver section (receiver) of the EPG data management system for digital TV (television) to which the present invention has been applied. A front-end 11 composing the receiver section receives the data transmitted from the multiplexer 9 in the transmitter section shown in FIG. 1 and supplies it to a de-multiplexer 12. The de-multiplexer 12 de-multiplexes the multiplexed data supplied from the front-end 11. Among the de-multiplexed data, the de-multiplexer 12 supplies the data of video and voice to a decoder 13, the transmission management information of the program such as program management information to a main processor 14 and the EPG related information to an EPG data management engine 16.

After decoding the data of video and voice supplied from the de-multiplexer 12, the decoder 13 supplies it to a display processor 17. Among the program management information supplied from the de-multiplexer 12, the main processor 14 supplies information related to display to the display processor 17. The EPG data management engine 16 supplies predetermined one among the data supplied from the de-multiplexer 12 to an EPG data memory 18 as necessary to store therein. The EPG data management engine 16 also combines the data supplied from the de-multiplexer 12 with the data stored in the EPG data memory 18 to supply to the display processor 17 as display information.

The display processor 17 outputs video signals corresponding to the data supplied from the decoder 13, the main processor 14 and the EPG data management engine 16 to display on a predetermined screen.

Figure 3:
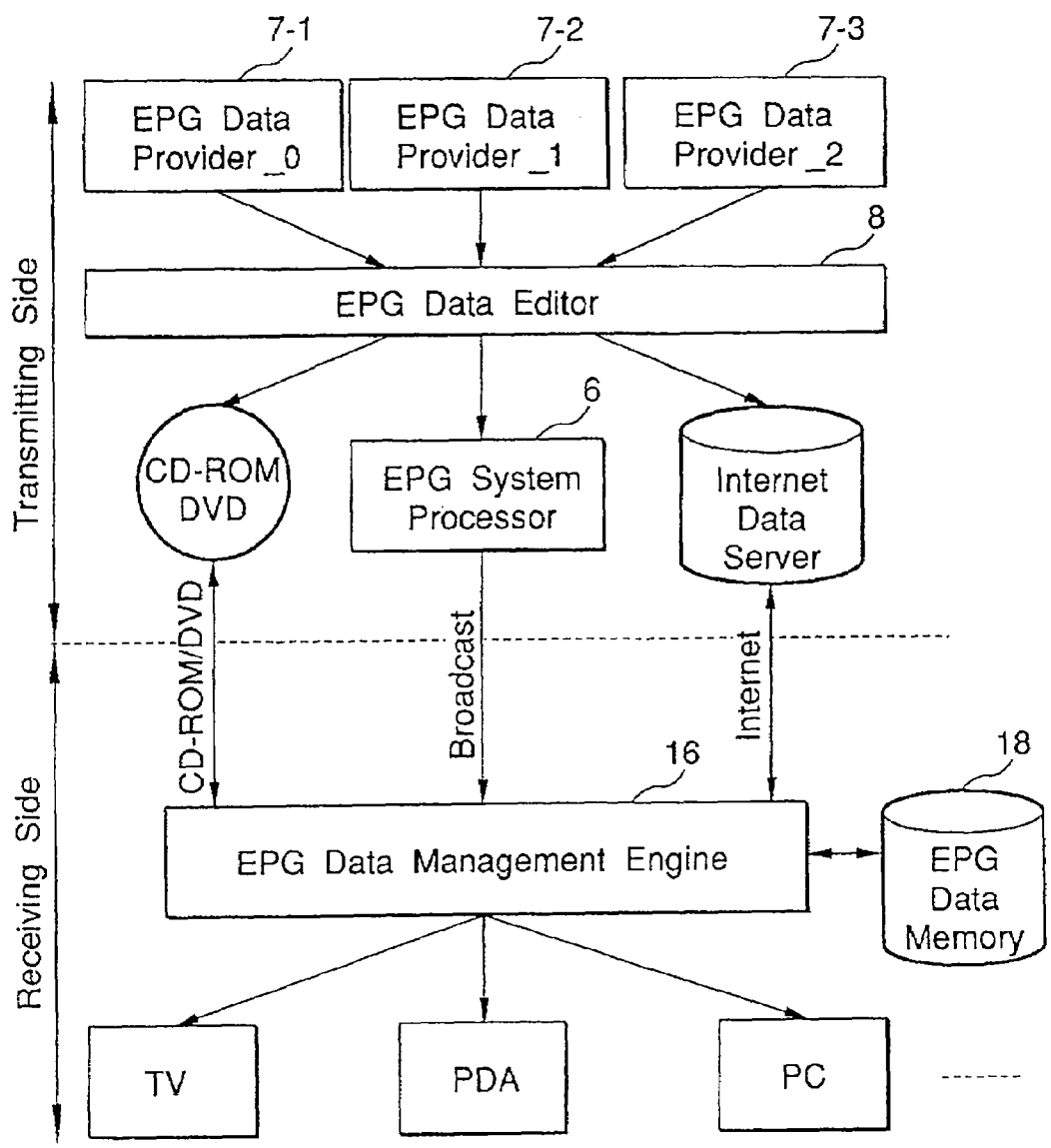
FIG. 3 is a diagrammatic view of the transmitter section and the receiver section shown in FIGS. 1 and 2.

FIG. 3 is a conceptual diagram in transmitting the data from the transmitter section to the receiver section.

Information related to a program can be obtained from a plurality of EPG data providers such as an EPG data provider 7-1 (EPG Data Provider_0), an EPG data provider 7-2 (EPG Data Provider_1) and an EPG data provider 7-3 (EPG Data Provider_2). The obtained information is supplied to the EPG data editor 8. The EPG data supplied to the EPG data editor 8 is edited and managed by the EPG data editor 8. The edited information is supplied and recorded as EPG information in a fixed medium such as a CD-ROM (compact disc-read only memory) and a DVD (digital versatile disc).

After being supplied to the EPG system processor 6 in the transmitter side as EPG transmission information, the information in the EPG data editor 8 is transmitted to the receiver side by means of digital broadcasting and the like. Further, the information in the EPG data editor 8 is transmitted to Internet data servers as EPG information and is then transmitted to the receiver side through Internet. The structure of the EPG data will be described later with reference to FIG. 16.

The EPG information (EPG data) transmitted via respective media is supplied to the EPG data management engine 16 on the receiver side. The EPG data management engine 16 supplies the EPG data transmitted from the transmitter side to the EPG data memory 18 as necessary to store therein. Based on the information transmitted and accumulated, the EPG information is transmitted to and displayed on TVs, PDAs (personal digital assistants) and PCs (personal computers) as EPG display information.

Figure 4:
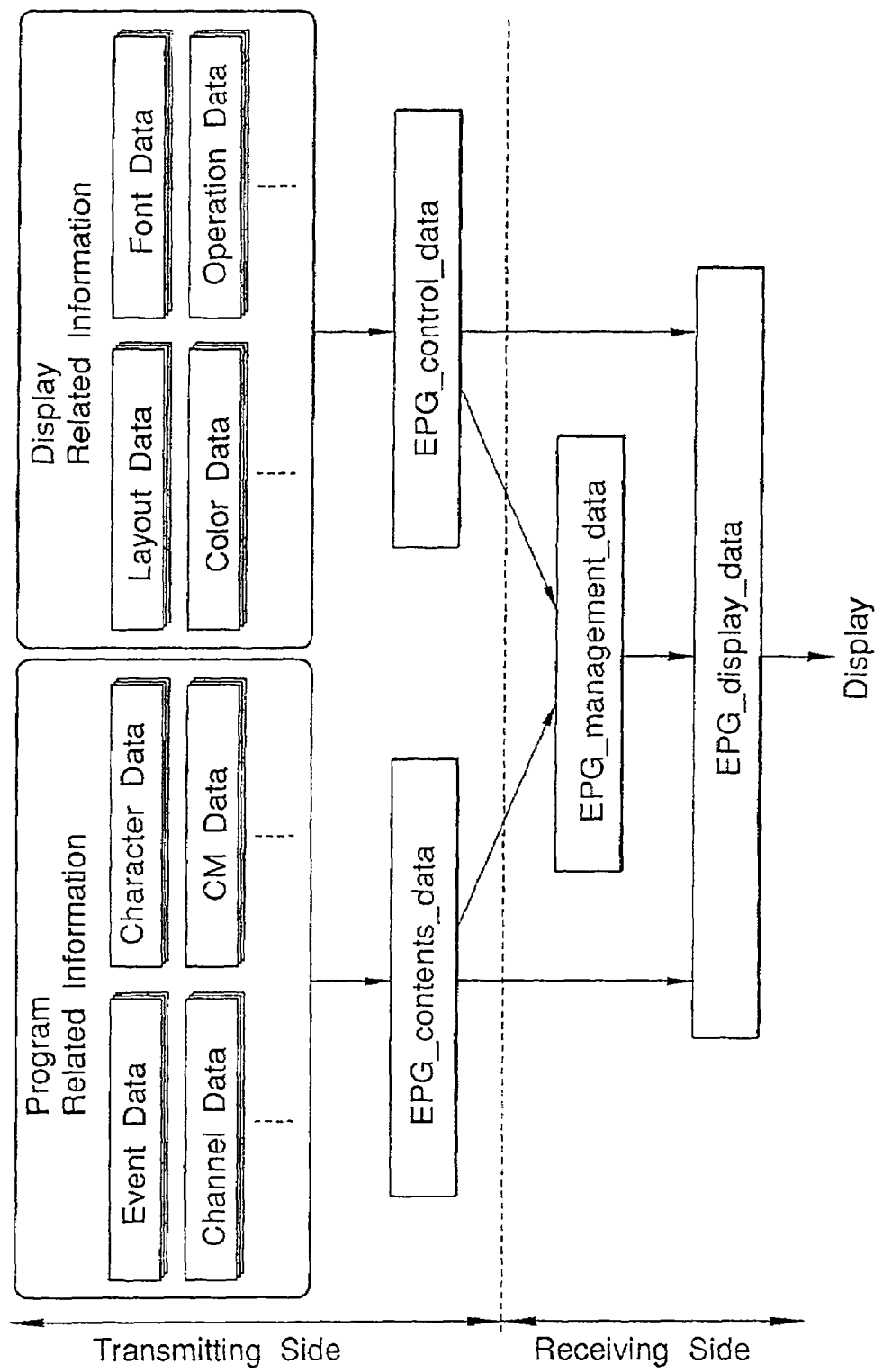
FIG. 4 is a diagram showing flows of data between the transmitter section and the receiver section shown in FIGS. 1 and 2.

FIG. 4 shows flows of the data when transmitted from the transmitter section to the receiver section. The information related to the EPG is categorized roughly into program related information and display related information. The program related information is composed of event data showing a duration and a broadcasting channel of the program to be broadcasted, a title of the program and the like, character data showing information on cast and the like of the program, channel data showing data of the broadcasting station such as a station icon and the name of the broadcasting station, CM data showing CM related information, and the like.

Meanwhile, the display related information is composed of layout data showing a layout of the EPG display screen, font data showing data of fonts to be displayed, color data showing colors to be displayed, operation data describing manipulation the screen, and the like.

The EPG data editor 8 converts the program related information into EPG_contents_data to be transmitted to the receiver side. The EPG data editor 8 also converts the display related information into EPG_control_data to be transmitted to the receiver side.

In the receiver side, EPG_management_data which is interim data within the receiver side is generated as necessary from the EPG_contents_data and the EPG_control_data transmitted from the transmitter side. Further, EPG_display_data which is data for display is generated in the receiver side from the EPG_contents_data, the EPG_control_data and the EPG_management_data. This EPG_display_data is supplied to TVs, PDAs, PCs and the like to display the corresponding EPG screen.

Figure 5:
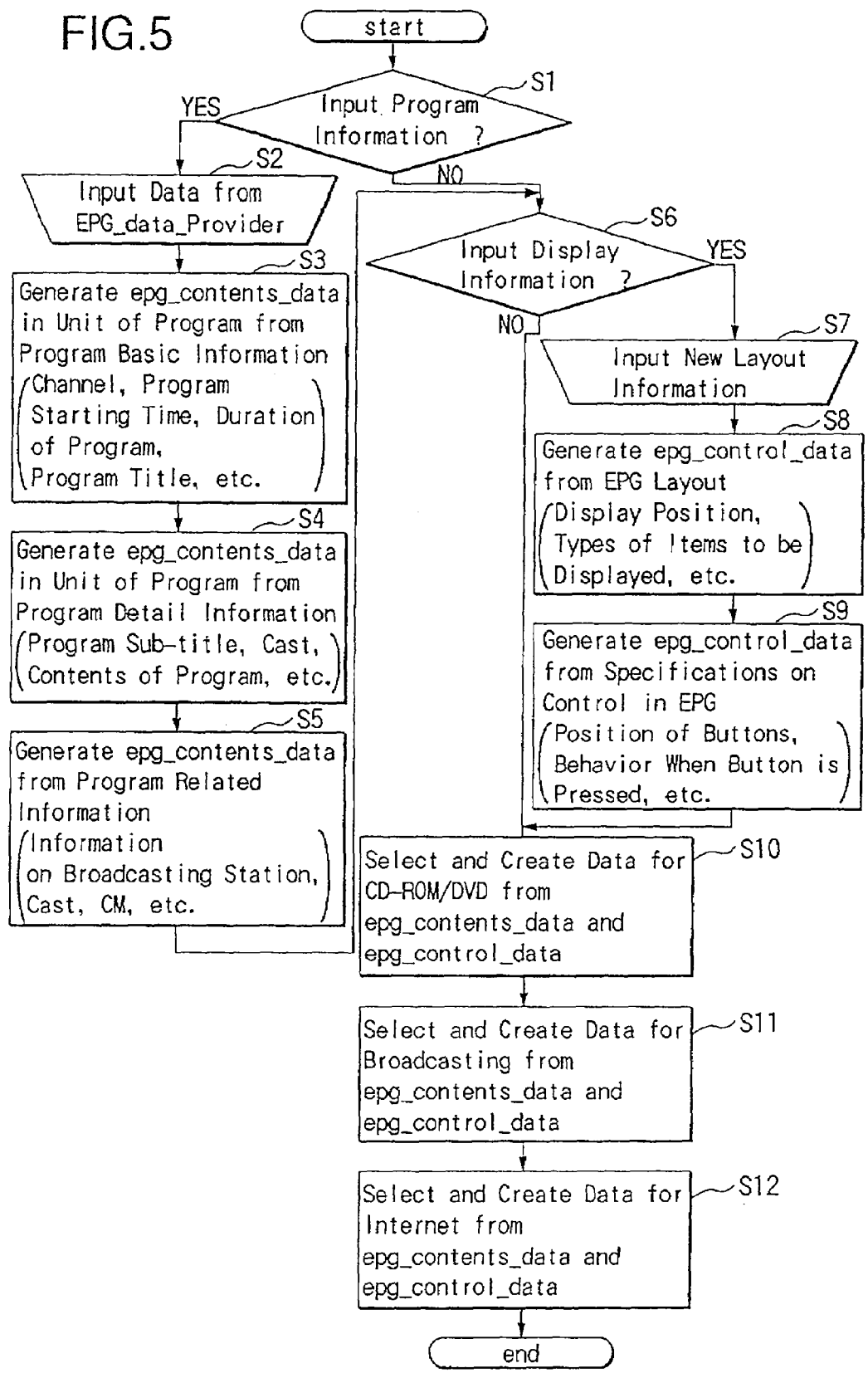
FIG. 5 is a flowchart explaining the operation of the transmitter section shown in FIG. 1.

Next, the operation of the transmitter section shown in FIG. 1 will be explained with reference to a flowchart in FIG. 5. At first, it is determined whether or not to input program information by the main system processor 2 of the transmitter section in Step S1. When it is determined to input the program information, the process advances to Step S2 to input data from the EPG data provider 7 and to supply to the EPG data editor 8.

Next, the EPG data editor 8 generates EPG_contents_data in unit of program from program basic information, e.g. a channel, program starting time, a length of the program, the program title and the like in Step S3. Then, the process advances to Step S4 to generate EPG_contents_data in unit of program from program detail information, e.g. the program Sub-title, cast, contents of the program and the like. Next, the EPG_contents_data is generated from the related information, e.g. information on a broadcasting station, cast, CM and the like, in Step S5.

When the process in Step S5 ends or when it is determined in Step S1 not to input the program information, the process advances to Step S6. In Step S6, it is determined whether or not to input display information. When it is determined to input the display information, the process advances to Step S7 to input new layout information from the EPG data provider 7 by the EPG data editor 8. Next, EPG_control_data is generated from the new layout information input in Step S7, i.e. EPG layout (display position, types of items to be displayed, etc.) in Step S8. Next, the EPG_control_data is generated from the specifications on control in the EPG (position of buttons, behavior when the button is pressed, etc.) in Step S9.

When the process in Step S9 ends or when it is determined not to input the display information in Step S6, the process advances to Step S10. In Step S10, the EPG data editor 8 selects and creates data for CD-ROM/DVD from the EPG_contents_data and the EPG_control_data. In Step S11, the EPG data editor 8 selects and creates data for broadcasting from the EPG_contents_data and the EPG_control_data. In Step S12, the EPG data editor 8 selects and creates data for Internet from the EPG_contents_data and the EPG_control_data. Then, the process ends.

Figure 6:
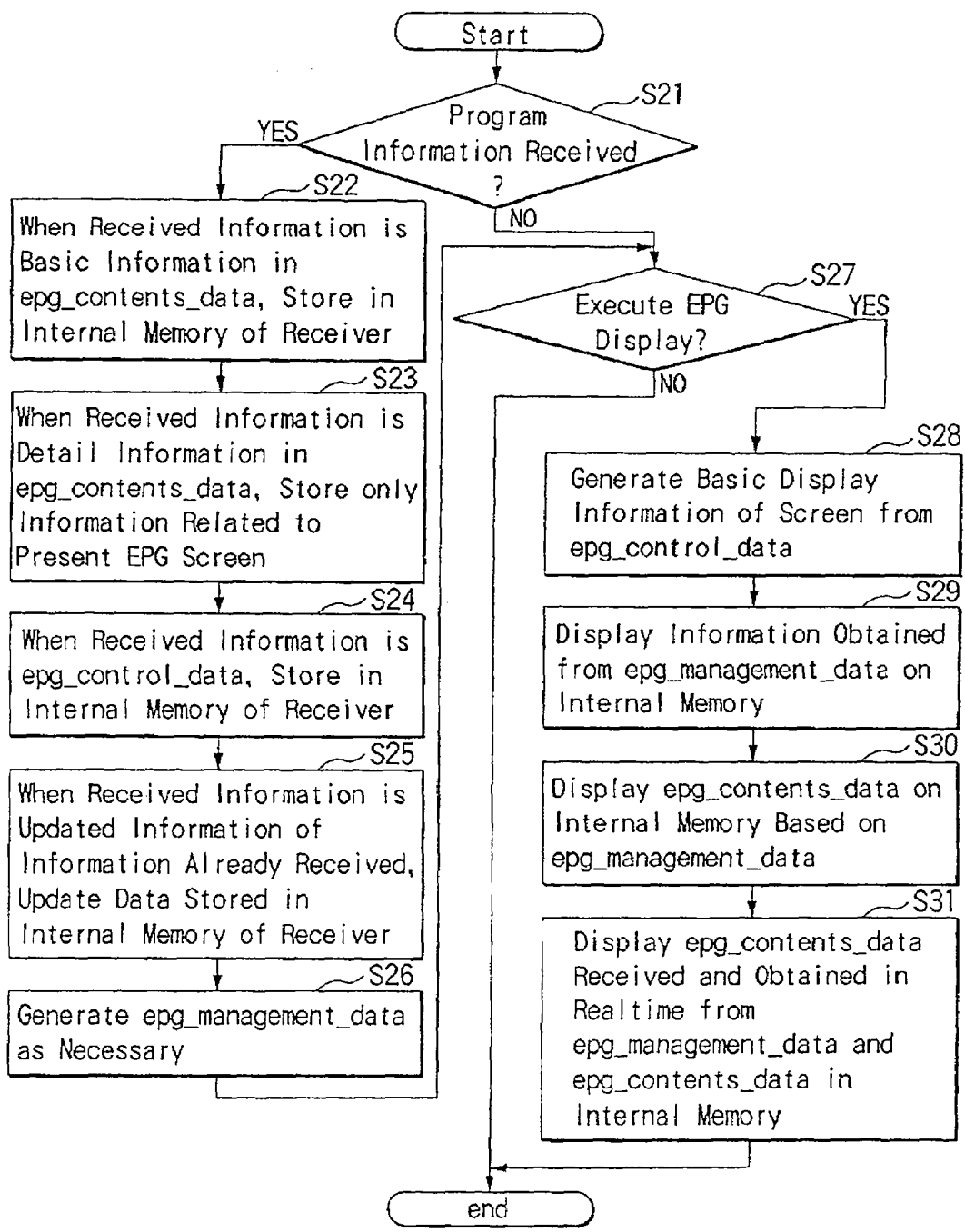
FIG. 6 is a flowchart explaining the operation of the receiver section shown in FIG. 2.

Next, the operation of the receiver section shown in FIG. 2 will be explained with reference to a flowchart in FIG. 6. At first, it is determined in Step S21 whether or not to receive the program information transmitted from the transmitter section shown in FIG. 1 by the main processor 14 in the receiver section. When it is determined to receive the program information, the process advances to Step S22 to receive the program information by the front-end 11. The program information received by the front-end 11 is de-multiplexed by the de-multiplexer 12 and is supplied to the main processor 14. When the information supplied to the main processor 14 is basic information of the EPG_contents_data, it is supplied and stored in the internal memory (EPG data memory) 18 within the receiver section via the EPG data management engine 16.

When the information supplied to the main processor 14 is detail information of the EPG_contents_data, only information related to the present EPG screen is supplied to and stored in the EPG data memory 18 within the receiver section via the EPG data management engine 16 in Step S23.

When the information supplied to the main processor 14 is the EPG_control_data, it is supplied to and stored in is the EPG data memory 18 within the receiver section via the EPG data management engine 16 in Step S24.

When the information supplied to the main processor 14 is updated information of the information already received, information stored in the EPG data memory 18 within the receiver section is updated in Step S25.

Next, the EPG_management_data is generated as necessary in Step S26.

When the process in Step S26 ends or when it is determined not to receive the program information in Step S21, the process advances to Step S27 to determine whether or not to execute display of EPG. When it is determined to execute the EPG display, the process advances to Step S28 to generate basic display information from the EPG_control_data. Next, information obtained from the EPG_management_data on the internal memory 18 is displayed in Step S29.

In Step S30, the EPG_contents_data on the internal memory 18 is displayed based on the EPG_management_data. Then, the process advances to Step S31 to display the EPG_contents_data received and obtained in real-time from the EPG_management_data and the EPG_contents_data on the internal memory 18. When the process in Step S31 ends or when it is determined not to execute the EPG display in Step S27, the process ends.

Figure 7:
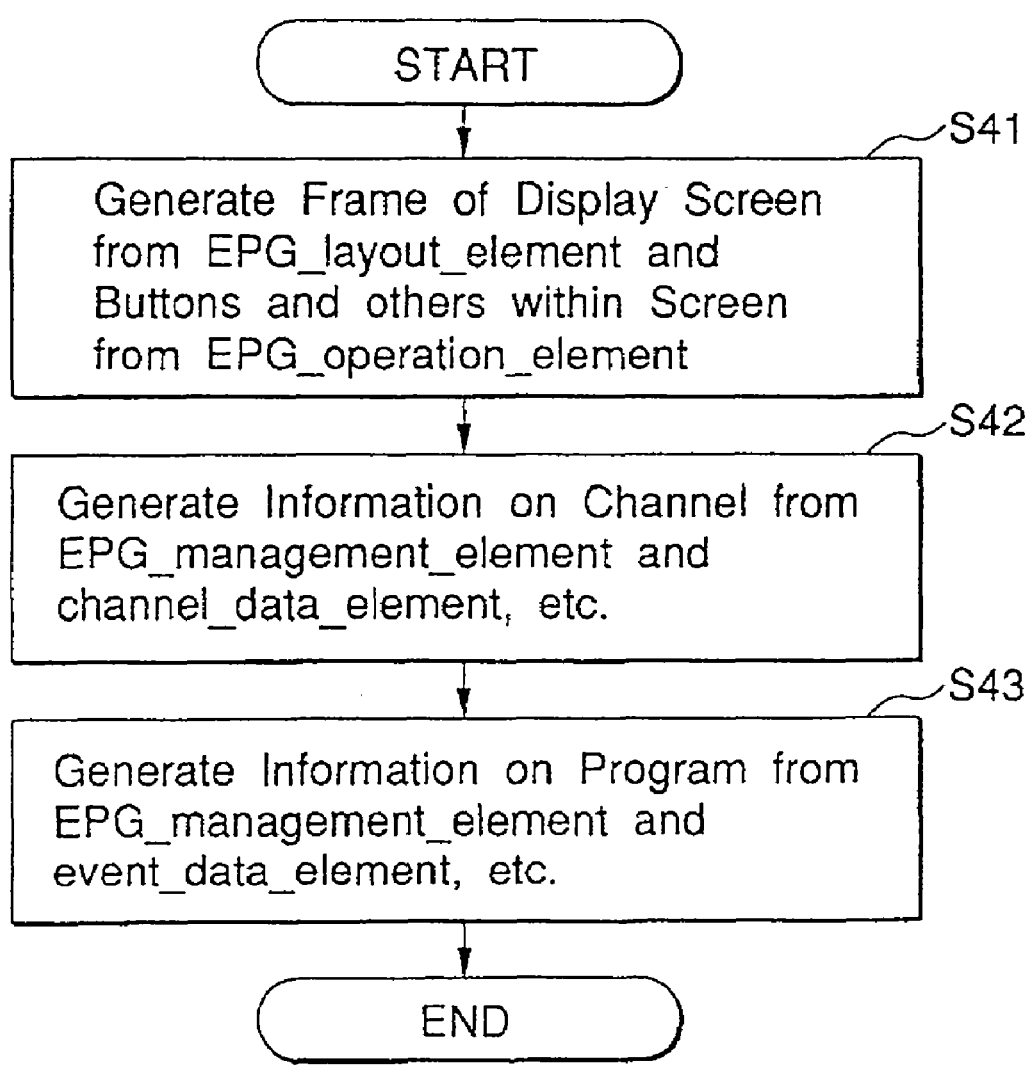
FIG. 7 is a flowchart explaining procedural steps of a displaying process.
Figure 8:
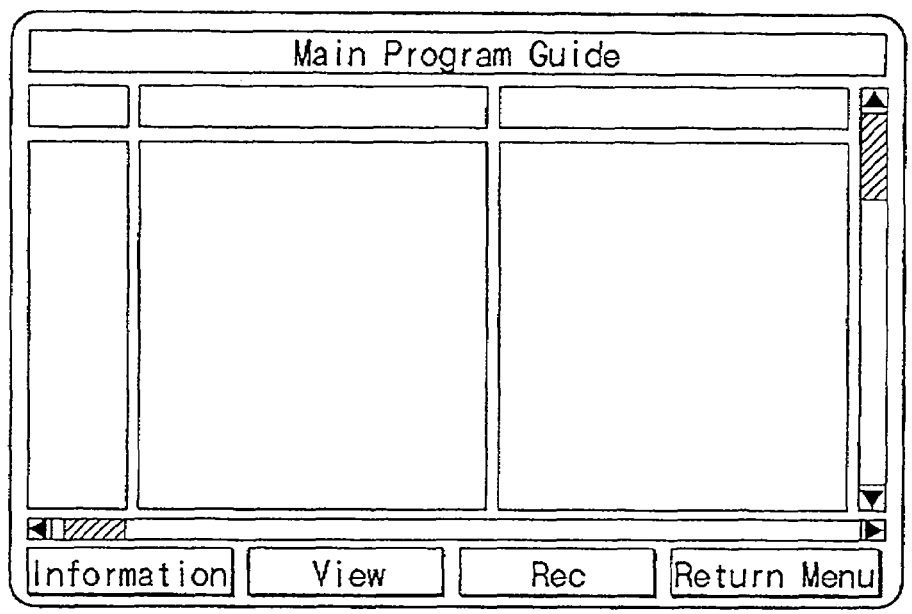
FIG. 8 shows an exemplary display screen.

Next, the procedural steps for displaying the information related to the program will be explained with reference to a flowchart shown in FIG. 7. At first, a frame of the display screen is generated and displayed from EPG_layout_element (main_layout_element, box_layout_element and cell_layout_element described later in FIG. 38) and buttons and others within the screen are generated and displayed from EPG_operation_element (main_operation_element, box_operation_element and cell_operation_element described later in FIG. 38). Thereby, a screen as shown in FIG. 8 is displayed. In case of the exemplary screen, "Main Program Guide" is displayed as the title of the screen and the buttons of "Information", "View", "Rec" and "Return Menu" are displayed.

Figure 9:
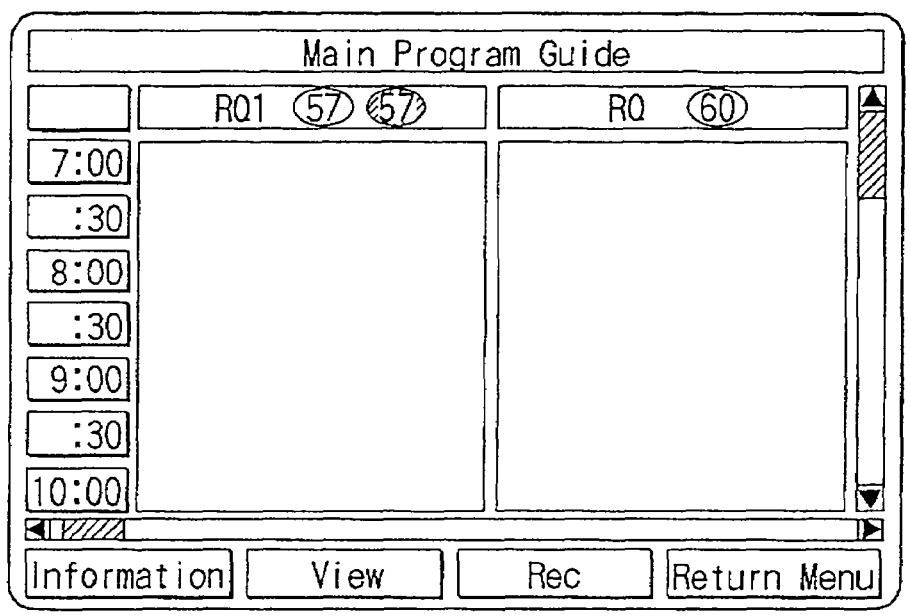
FIG. 9 shows another exemplary display screen.

Next, information concerning on a channel is generated and displayed from the EPG_management_element (main_management_element, box_management_element and cell_management_element described later in FIG. 16), channel_data_element and the like in Step S42. Thereby, the channel No. and the name of respective broadcasting stations are displayed as shown in FIG. 9. In case of the exemplified screen, channel No. 57 (name of broadcasting station: RQ1) and channel No. 60 (name of broadcasting station: RQ2) are displayed.

Figure 10:
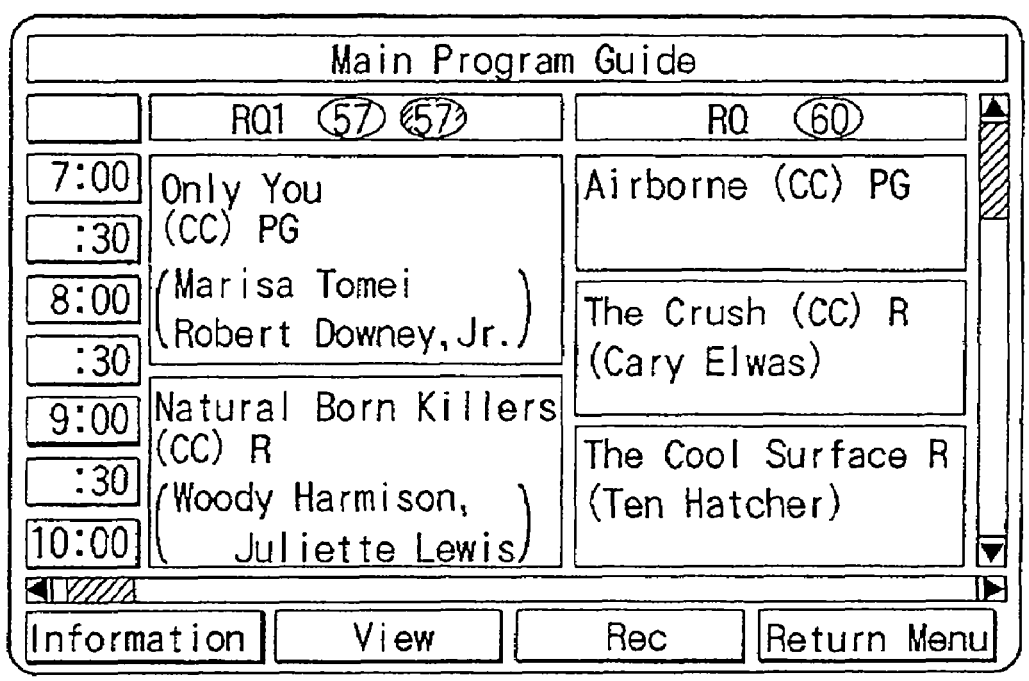
FIG. 10 shows a still other exemplary display screen.

Next, the process advances to Step S43 to generate and display information concerning on the program from the EPG_management_element, event_data_element and the like. Thereby, information on titles of the programs, cast and the like are displayed per each channel as shown in FIG. 10.

Figure 11:
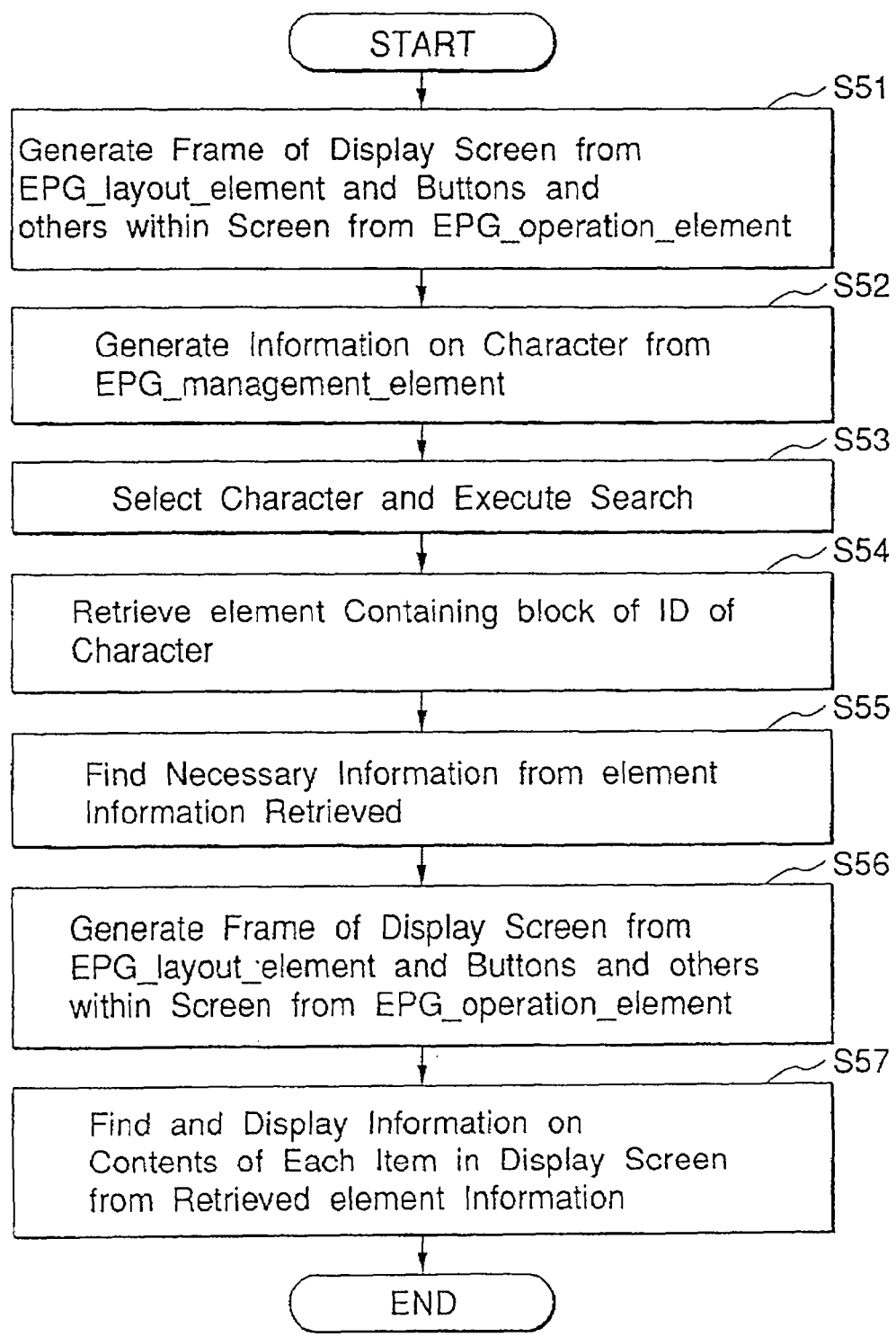
FIG. 11 is a flowchart explaining procedural steps of a retrieving process.
Figure 12:
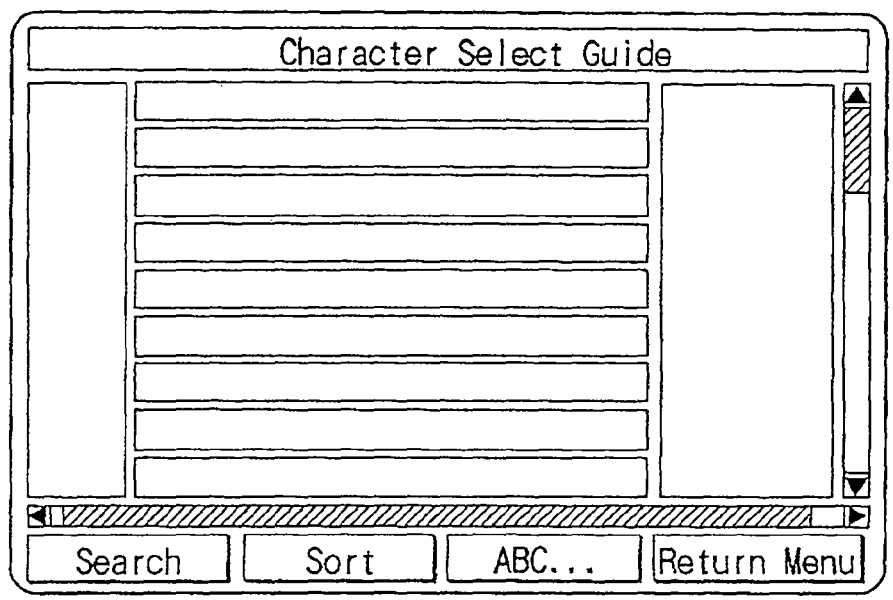
FIG. 12 shows an exemplary display screen.

Next, procedural steps in searching and displaying information concerning on a specific character for example will be explained with reference to a flowchart in FIG. 11. At first, the frame of the display screen is generated and displayed from the EPG_layout_element and the buttons and others within the screen are generated and displayed from the EPG_operation_element in Step S51. Thereby, the title of the screen and the buttons are displayed as shown in FIG. 12. In case of the exemplified screen, "Character Select Guide" is displayed as the title of the screen and the buttons "Search", "Sort", "ABC . . . " and "Return Menu" are displayed.

Figure 13:
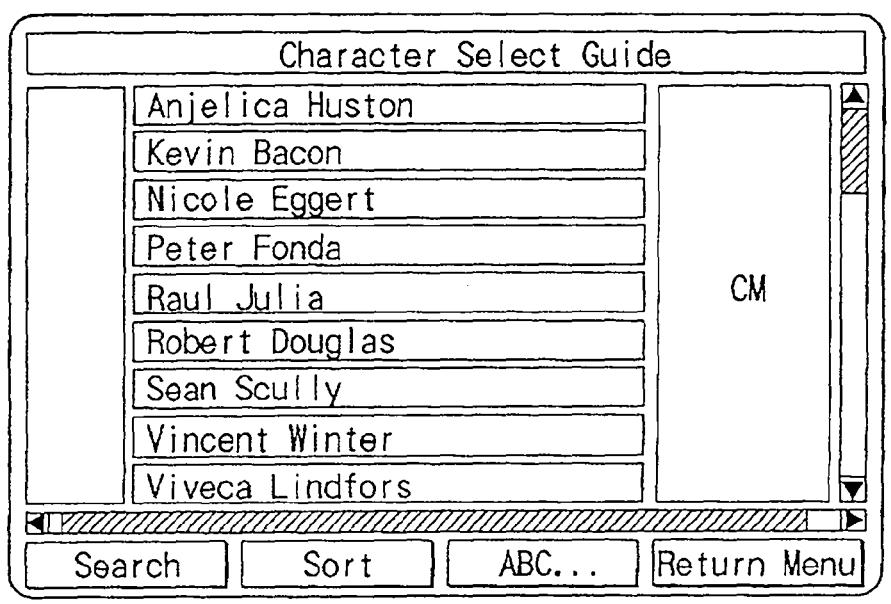
FIG. 13 shows an exemplary display screen.
Figure 14:
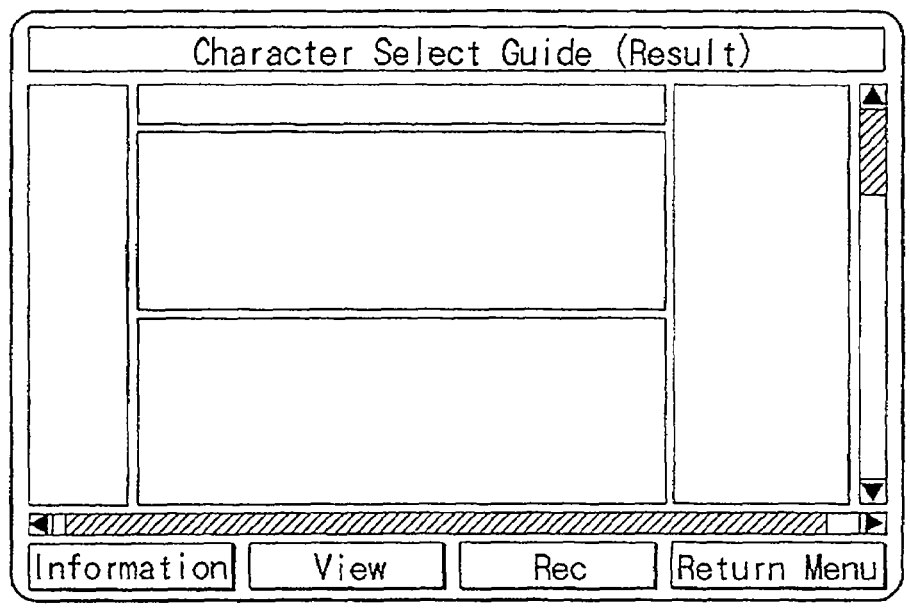
FIG. 14 shows an exemplary display screen.

Next, information concerning on the cast is generated from the EPG_management_element and displayed in Step S52. Thereby, a list of names of the cast is displayed as shown in FIG. 13. In Step S53, the name of the desired character is displayed on the screen by manipulating a scroll bar as necessary to select on the screen shown in FIG. 13. Thereby, the search for information concerning on the selected character is executed.

Then, the process advances to Step S54 to retrieve an element containing a block of ID of the character. In Step S55, necessary information is taken out of the information of the retrieved element. Then, the frame of the display screen is generated and displayed from the EPG_layout_element and the buttons and others within the screen are generated from the from EPG_operation_element and are displayed on the screen. Thereby, in case of the exemplified screen, "Character Select Guide (Result)" is displayed as the title of the screen and the buttons "Information", "View", "Rec" and "Return Menu" are displayed.

Figure 15:
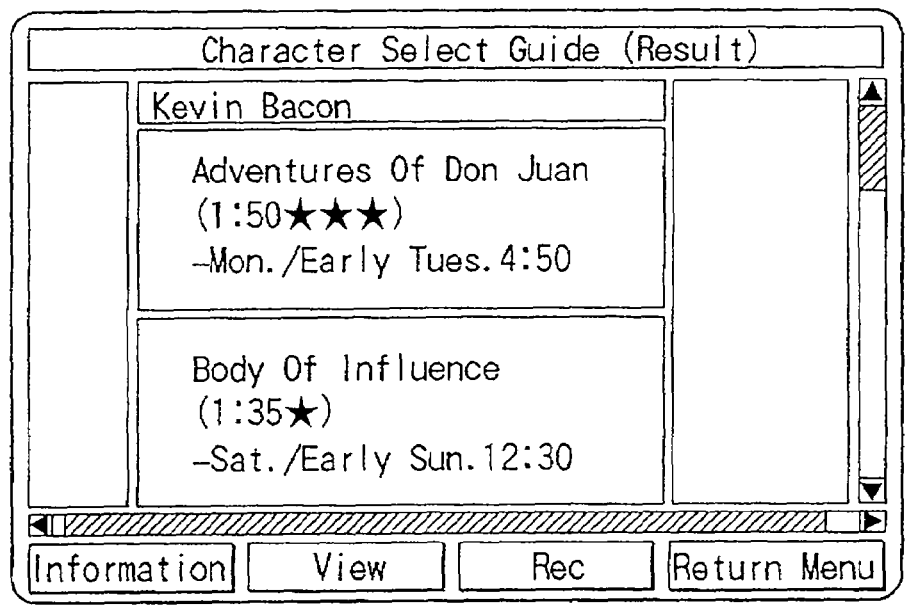
FIG. 15 shows an exemplary display screen.

Next, the process advances to Step S57 to find and display information on contents of each item of the display screen from the retrieved element information. Thereby, information on the character selected in Step S53, i.e. "Kevin Bacon" in this case, e.g. the on-Air date and duration of a movie in which Kevin Bacon appears, is displayed as shown in FIG. 15.

FIG. 16 is a list of the EPG data. As shown in the list, the EPG data is composed of EPG_cotnents_data, EPG_control_data, EPG_management_data and EPG_display_data. Further, the EPG_cotnents_data is composed of event_data_element describing information on a broadcasting program, channel_data_element describing information on a broadcasting station, character_data_element describing information on characters, material_data_element describing information on materials, company_data_element describing information on a company, text_data_element describing information on a text, picture_data_element describing information on a picture, sound_data_element describing information on sound, movie_data_element describing information on a movie, and CM_data_element describing information on a CM.

The EPG_control_data is composed of main_layout_element describing main information on a browser layout, box_layout_element describing box information on the browser layout and cell_layout_element describing cell information on the browser layout, main_operation_element describing main information on browser control, box_operation_element describing box information on the browser control and cell_operation_element describing cell information on the browser control.

The EPG_management_data is composed of main_management_element describing main information on browser management, box_management_element describing box information on the browser management, cell_management_ element describing cell information on the browser management and list_management_element describing information on a program list.

Figure 17:
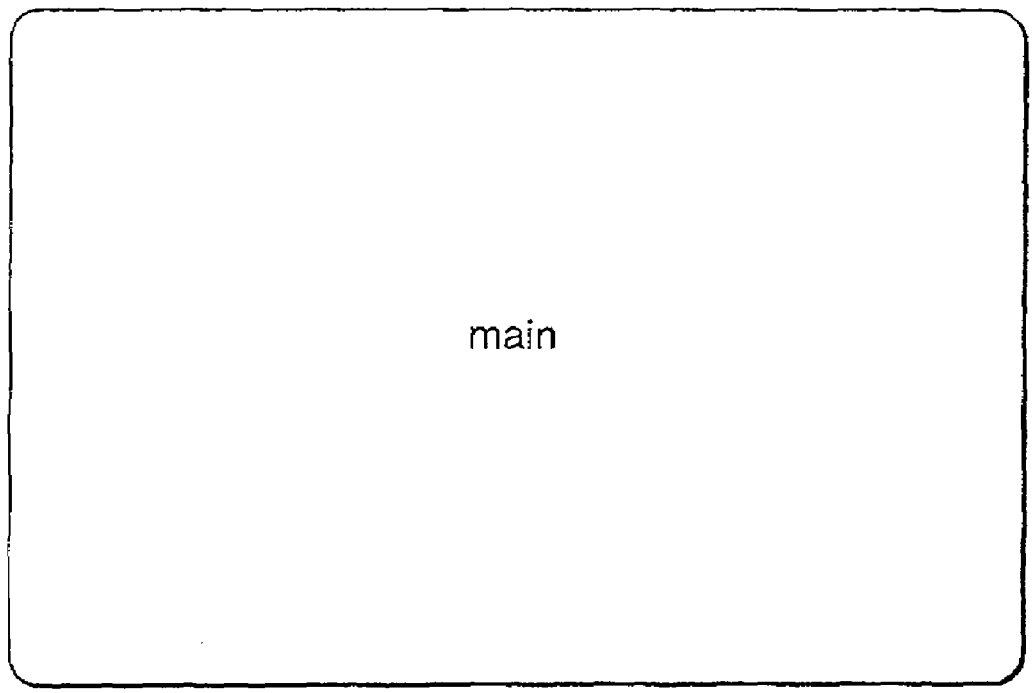
FIG. 17 shows an exemplary display screen.
Figure 18:
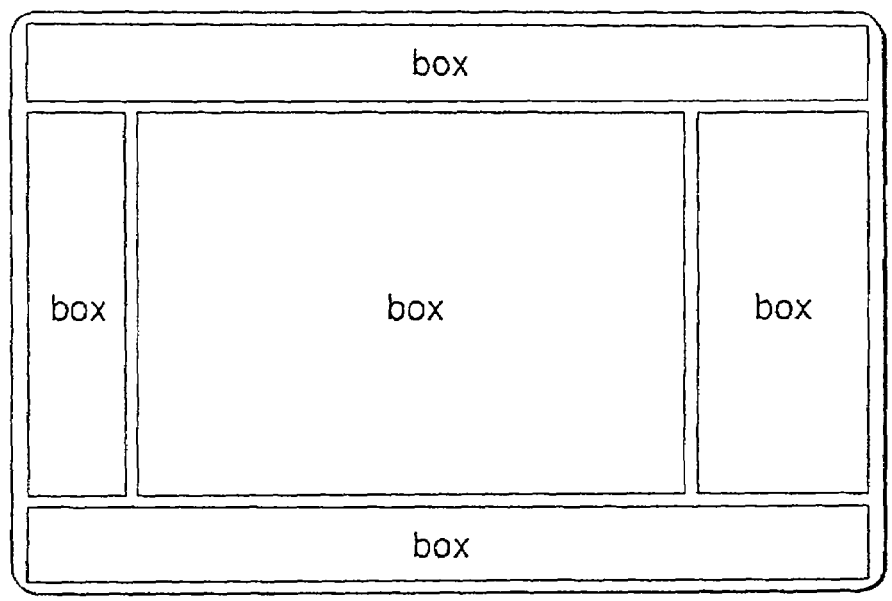
FIG. 18 shows an exemplary display screen.
Figure 19:
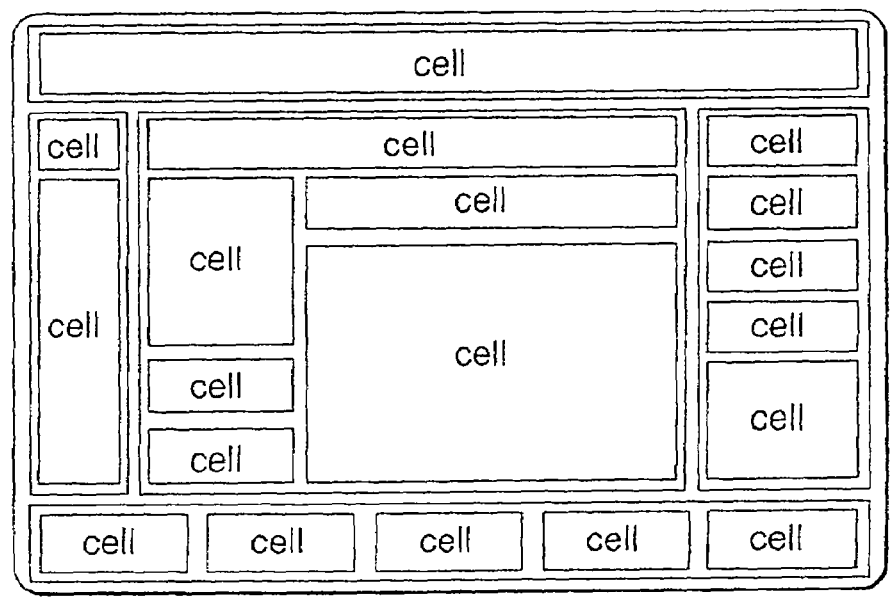
FIG. 19 shows an exemplary display screen.

Here, the structure of the screen will be explained. The screen is composed of a main screen, boxes and cells. The main screen means the whole screen as shown in FIG. 17. The box is a rectangular area obtained by dividing the main screen as shown in FIG. 18 and the cell is a rectangular area obtained by dividing the box as shown in FIG. 19.

Figure 20:
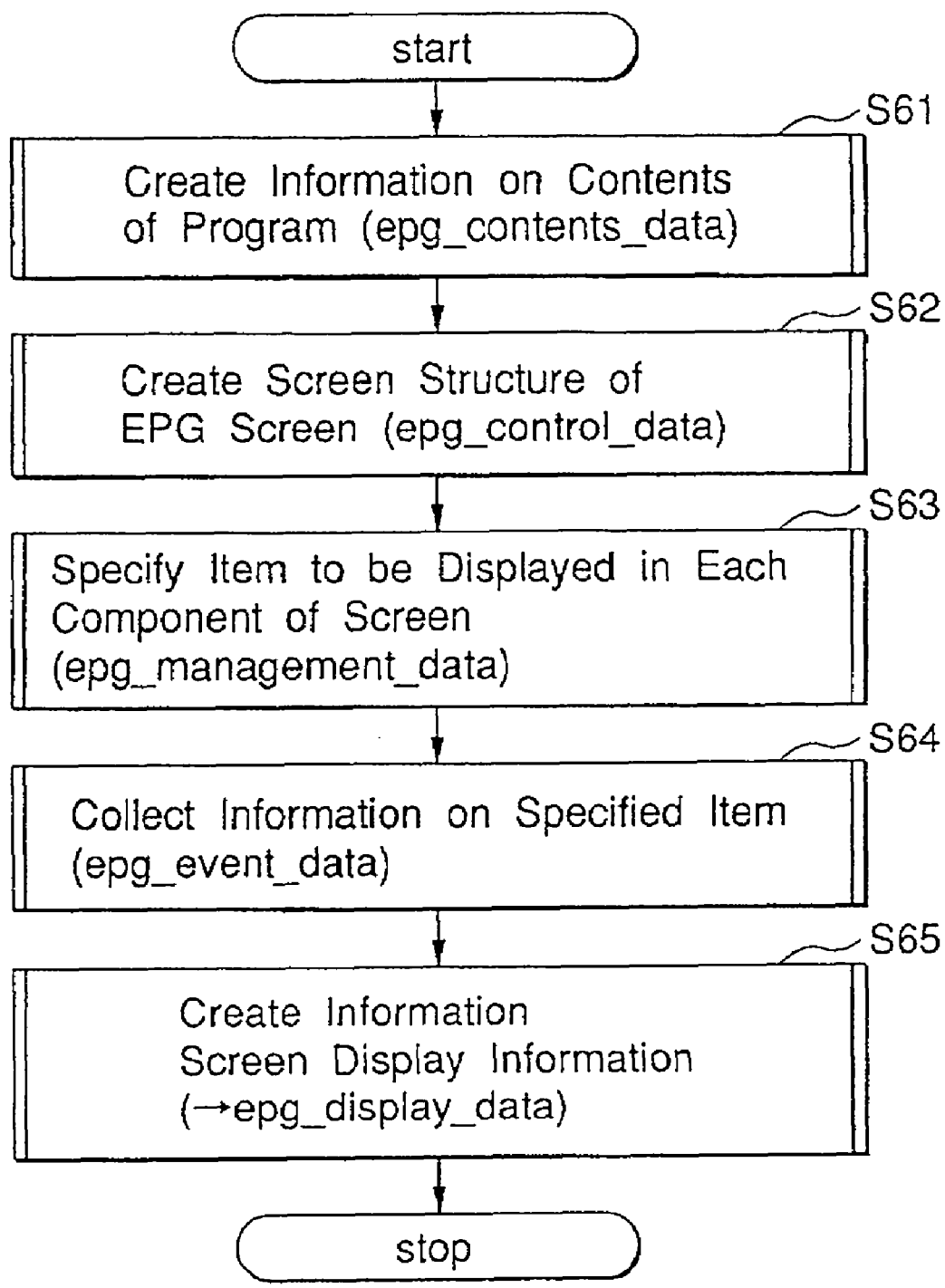
FIG. 20 is a flowchart for explaining procedural steps for creating screen display information.

Next, procedural steps for creating the screen display information (EPG_display_data) shown in FIG. 16 will be explained with reference to a flowchart in FIG. 20. At first, information on contents of the program (EPG_contents_data) is created in the transmitter section in Step S61. Then, data representing the structure of the EPG screen (EPG_control_data) is generated in Step S62. The EPG_contents_data and the EPG_control_data are transmitted to and received by the receiver side. Next, the process advances to Step S63 to specify items to be displayed in each structural element of the screen from the EPG_contents_data sent from the transmitter section to generate EPG_management_data.

In Step S64, information of the specified item is collected to generate EPG_event_data. Then, the process advances to Step S65 to create display data (EPG_display_data) based on the EPG_contents_data, the EPG_control_data and the EPG_management_data.

Figure 21:
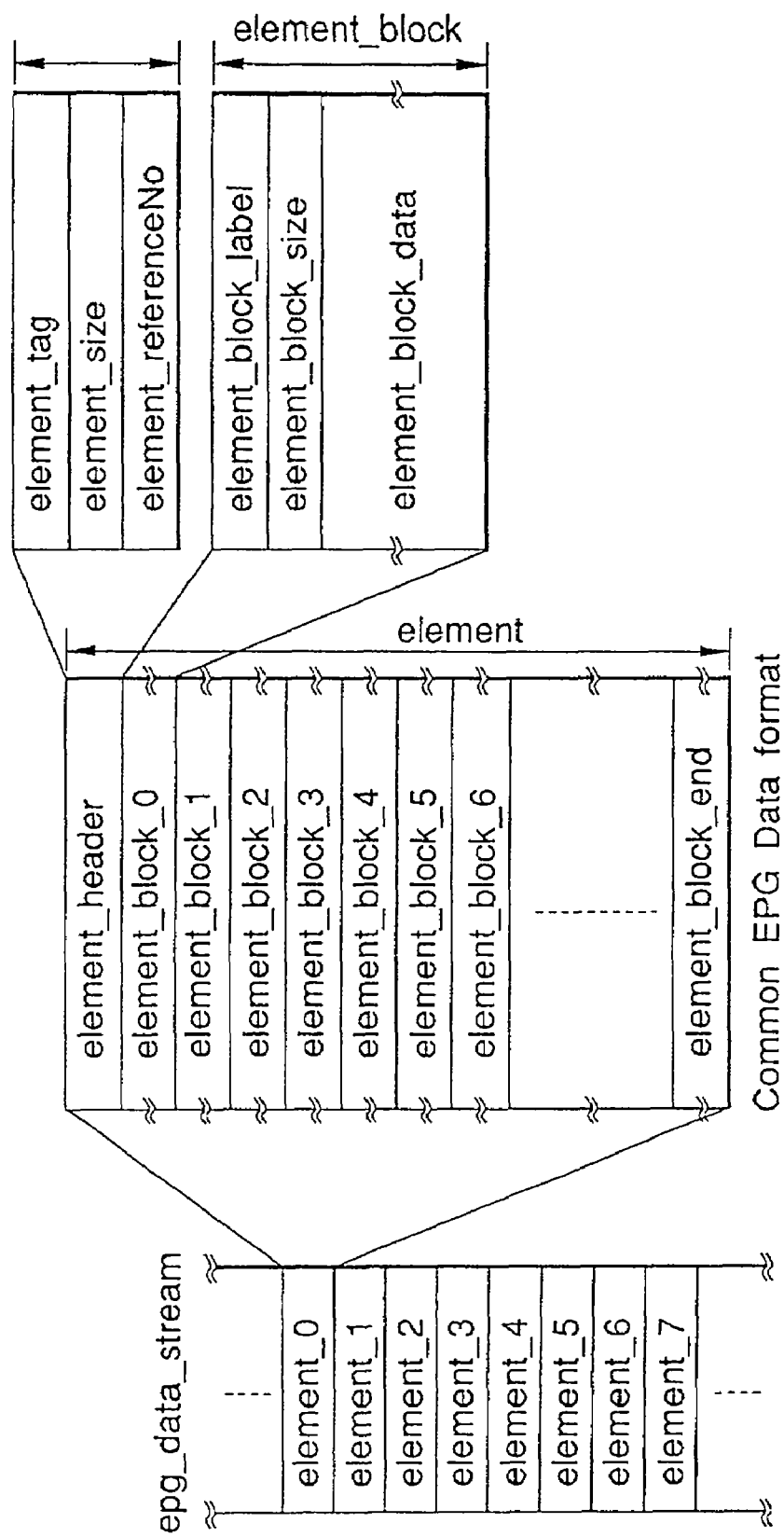
FIG. 21 shows an exemplary format of the EPG data.

FIG. 21 shows a structural example of EPG_data_stream. As shown in the figure, the EPG_data_stream is composed of an element_header and a plurality of element_blocks. The element_header is composed of element_tag, element_size and element_referenceNo and each element_block is composed of element_block_label, element_block_size and element_block_data.

Kinds of the element block include identification No. (ID) allocated to each element_block, a numerical value, a character string (text), a picture, sound, a movie, a time and the like as shown in FIG. 22.

FIG. 23 shows event_data_element_blocks composing an element whose element_tag of element_header is event_data_tag. FIG. 24 shows the structure of the event_data_element. As shown in FIGS. 23 and 24, the event_data_element is composed of respective element_blocks describing ID allocated in unit of program (event_no), program starting date/time (onAir_time), a duration of the program (duration), ID of a channel broadcasting the program (channel_no), ID of the program category (category_no), ID of the program type (Program_type), the main title of the program (main_title), the sub-title of the program (sub_title), the contents of the program (1st_detail), the detailed contents of the program (2nd_detail), ID representing the character in the program (character_no), ID representing a picture related to the program (picture_no), ID representing sound related to the program (sound_no), ID representing a movie related to the program (movie_no), and ID representing a company related to the program (company_no).

Figure 26A:
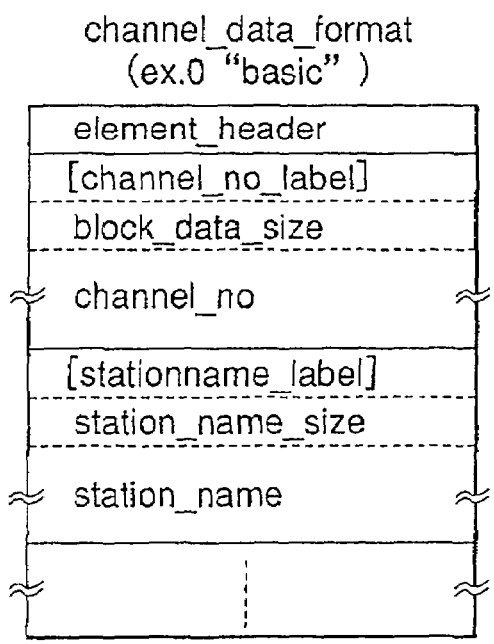
FIG. 26 is a table showing formats of channel_data_element.
Figure 26B:
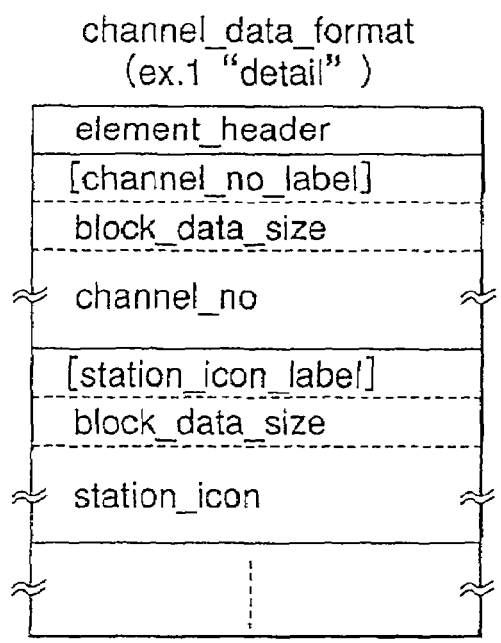

FIG. 25 shows channel_data_element_blocks composing an element whose element_tag of element_header is channel_data_tag. FIG. 26 shows the structure of the channel_data_element. As shown in FIGS. 25 and 26, the channel_data_element is composed of respective element_blocks describing ID allocated in unit of channel (channel_no), the name of the broadcasting station (station_name), a picture of a logo of the broadcasting station (station_icon), ID of a picture related to the broadcasting station (picture_no), ID of sound related to the broadcasting station (sound_no), ID of a movie related to the broadcasting station (movie_no) and ID of a company related to the broadcasting station (company_no).

FIG. 27 shows character_data_element_blocks composing an element whose element_tag of element_header is character_data_tag. FIG. 28 shows the structure of the character_data_element. As shown in FIGS. 27 and 28, the character_data_element is composed of respective element_blocks describing ID allocated in unit of character (character_no), the name of the character (character_name), the age (character_age), the profile (character_profile), ID of a character related to the character (character_no), ID of a picture related to the character (picture_no), ID of sound related to the character (sound_no), and ID of a movie related to the character (movie_no).

FIG. 29 shows text_data_element_blocks composing an element whose element_tag of element_header is text_data_tag. As shown in FIG. 29, the text_data_element is composed of respective element_blocks describing ID allocated in unit of text (text_no), the text name (text_name), the format ID of the text (text_format_no), ID of a program related to the text (program_no), ID of a character related to the text (character_no), ID of a picture related to the text (picture_no), ID of sound related to the text (sound_no), and ID of a movie related to the text (movie_no).

FIG. 30 shows picture_data_element_blocks composing an element whose element_tag of element_header is picture_data_tag. As shown in FIG. 30, the picture_data_element is composed of respective element_blocks describing ID allocated in unit of a picture (picture_no), the picture name (picture_name), the format ID of the picture (picture_format_no), ID of a program related to the picture (program_no), ID of a character related to the picture (character_no), ID of a picture related to the picture (picture_no), ID of sound related to the picture (sound_no), and ID of a movie related to the picture (movie_no).

FIG. 31 shows sound_data_element_blocks composing an element whose element tag of element header is sound_data_tag. As shown in FIG. 31, the sound_data_element is composed of respective element_blocks describing ID allocated in unit of a sound (sound_no), the sound name (sound_name), the format ID of the sound (sound_format_no), ID of a program related to the sound (program_no), ID of a character related to the sound (character_no), ID of a picture related to the sound (picture_no), ID of sound related to the sound (sound_no), and ID of a movie related to the sound (movie_no).

FIG. 32 shows movie_data_element_blocks composing an element whose element_tag of element_header is movie_data_tag. As shown in FIG. 32, the movie_data_element is composed of respective element_blocks describing ID allocated in unit of a movie (movie_no), the movie name (movie_name), the format ID of the movie (movie_format_no), ID of a program related to the movie (program_no), ID of a character related to the movie (character_no), ID of a picture related to the movie (picture_no) ID of sound related to the movie (sound_no), and ID of a movie related to the movie (movie_no).

Figure 33B:
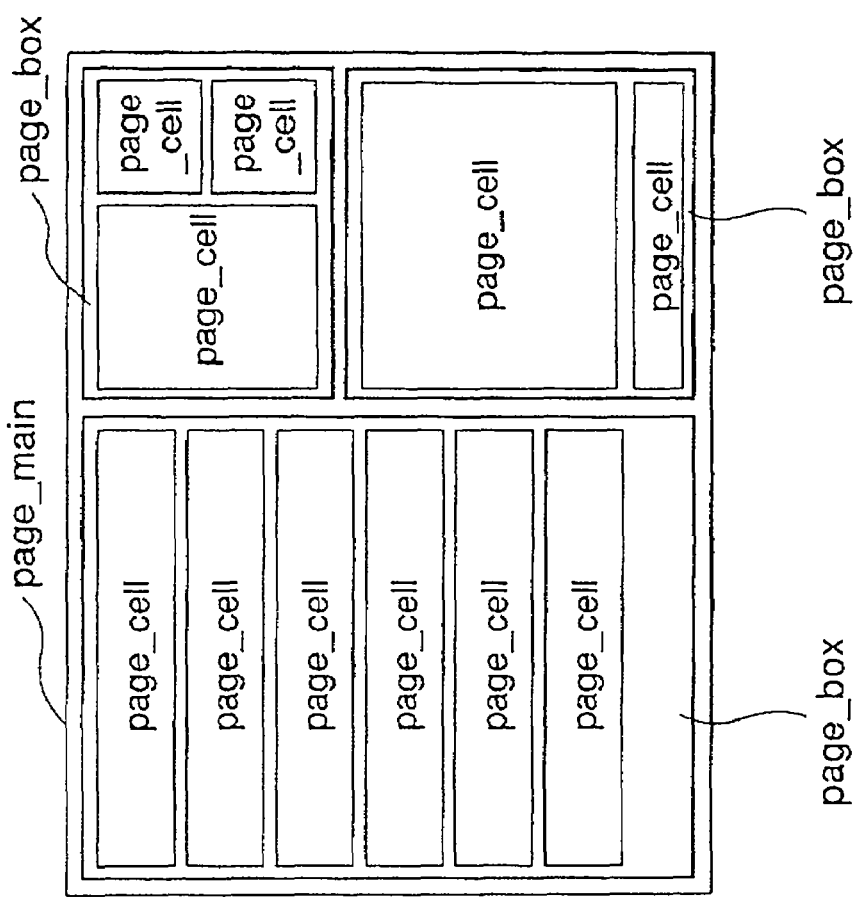
FIG. 33 shows an exemplary display screen.
Figure 33A:
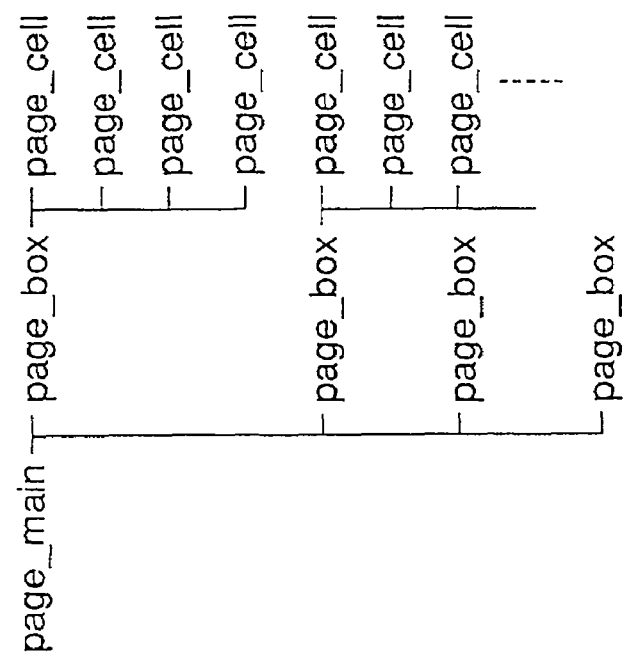

FIGS. 33A and 33B show a structural example of a screen page. As shown in FIG. 33A, page_main is composed of a predetermined number of page_boxes and each page_box is composed of a predetermined number of page_cells. In case of the example shown in FIG. 33B, the page_main is composed of three page_boxes, the page_box displayed on the left of the screen is composed of six page_cells, page_box displayed on the upper right of the screen is composed of three page_cells and page_box displayed on the lower right of the screen is composed of two page_cells.

FIGS. 34A through 34C show the structure of layout_element_block describing information for defining the structure of the screen as shown in FIG. 33. FIG. 34A shows layout_data_element_block composing an element whose element_tag of element_header is main_layout_tag. As shown in FIG. 34A, the layout_element_block is composed of ID allocated in unit of page to be displayed (page_no), the page name (page_name), the page display position (page_position) and ID of a box composing the page (box_no).

FIG. 34B shows layout_element_block composing an element whose element_tag of element_header is box_layout_tag. As shown in FIG. 34B, the layout_element_block is composed of ID allocated in unit of box (box_no), the box name (box_name), the box display position (box_position) and ID of a cell composing the box (cell_no).

FIG. 34C shows layout_element_block composing an element whose element_tag of element_header is cell_layout_tag. As shown in FIG. 34C, the layout_element_block is composed of ID allocated in unit of cell (cell_no), the cell name (cell_name), the cell display position (cell_position), ID of a program related to the cell (program_no), ID of a channel related to the cell (channel_no), ID of a character related to the cell (character_no) and ID of a material related to the cell (material_no).

Accordingly, the boxes may be displayed on the screen, the cells may be displayed in the box and information on the program, channel and the like may be related to each cell based on those information.

FIGS. 35 through 37 show detailed structural examples of the EPG_contents_data in the EPG_data shown in FIG. 16. As shown in the figures, the event_data_element composing the EPG_contents_data is composed of event_no_block describing the ID allocated in unit of program, onAir_time_block describing the program starting date/time, duration_block describing the duration of the program, onAir_channel_block describing the channel_no of the channel broadcasting the program, category_block describing the category_no of the category of the program, eventType_ block describing type_no of the program type, main_title_ block describing the main title of the program, sub_title_ block describing the sub-title of the program, 1st_detail_block describing the contents of the program, 2nd_detail_block describing the detailed contents of the program, relational_program_no_block describing program_no of the related program, relational_character_block describing character_no of the related character (cast), relational_material_block describing material_no of the related material, relational_company_block describing company_no of the related company (sponsor), relational_text_ block describing text_no of the related text, relational_picture_block describing picture_no of the related picture, relational_sound_block describing sound_no of the related sound, and relational_movie_block describing movie_no of the related movie.

The channel_data_element composing the EPG_contents_ data is composed of channel_no_block describing the ID allocated in unit of channel, station_name_block describing the name of the broadcasting station, station_icon_block describing the station_icon of the broadcasting station, relational_program_no_block describing program_no of the related program, relational_character_block describing character_no of the related character, relational_material_block describing material_no of the related material, relational_company_block describing compnay_no of the related company, relational_text_block describing text_no of the related text, relational_picture_block describing picture_no of the related picture, relational_sound_block describing sound_no of the related sound, and relational_movie_block describing movie_no of the related movie.

The character_data_element composing the EPG_contents_data is composed of character_no_block describing the ID allocated in unit of character, character_name_block describing the name of the character, character_age_block describing the age of the character, character_profile_block describing the profile of the character, relational_program_no_block describing program_no of the related program, relational_character_block describing character_no of the related character, relational_material_block describing material_no of the related material, relational_company_block describing compnay_no of the related company, relational_text_block describing text_no of the related text, relational_picture_block describing picture_no of the related picture, relational_sound_block describing sound_no of the related sound, and relational_movie_block describing movie_no of the related movie.

The material_data_element (see FIG. 36) composing the EPG_contents_data is composed of material_no_block describing the ID allocated in unit of material, material_name_block describing the name of the material, relational_program_no_block describing program_no of the related program, relational_character_block describing character_no of the related character, relational_material_block describing material_no of the related material, relational_company_block describing company_no of the related company, relational_text_block describing text_no of the related text, relational_picture_block describing picture_no of the related picture, relational_sound_block describing sound_no of the related sound, and relational_movie_block describing movie_no of the related movie.

The company_data_element composing the EPG_contents_data is composed of company_no_block describing the ID allocated in unit of company, company_name_block describing the name of the company, relational_program_no_block describing program_no of the related program, relational_character_block describing character_no of the related character, relational_material_block describing material_no of the related material, relational_company_block describing compnay_no of the related company, relational_text_block describing text_no of the related text, relational_picture_block describing picture_no of the related picture, relational_sound_block describing sound_no of the related sound, and relational_movie_block describing movie_no of the related movie.

The text_data_element composing the EPG_contents_data is composed of text_no_block describing the ID allocated in unit of text, text_name_block describing the name of the text, text_format_block describing the format ID of the text, relational_program_no_block describing program_no of the related program, relational_character_block describing character_no of the related character, relational_material_block describing material_no of the related material, relational_company_block describing compnay_no of the related company, relational_text_block describing text_no of the related text, relational_picture_block describing picture_no of the related picture, relational_sound_block describing sound_no of the related sound, and relational_movie_block describing movie_no of the related movie.

The picture_data_element composing the EPG_contents_data is composed of picture_no_block describing the ID allocated in unit of picture, picture_name_block describing the name of the picture, picture_format_block describing the format ID of the picture, relational_program_no_block describing program_no of the related program, relational_character_block describing character_no of the related character, relational_material_block describing material_no of the related material, relational_company_block describing compnay_no of the related company, relational_text_ block describing text_no of the related text, relational_picture_block describing picture_no of the related picture, relational_sound_block describing sound_no of the related sound, and relational_movie_block describing movie_no of the related movie.

The sound_data_element (see FIG. 37) composing the EPG_contents_data is composed of sound_no_block describing the ID allocated in unit of sound, sound_name_block describing the name of the sound, sound_format_block describing the format ID of the sound, relational_program_no_block describing program_no of the related program, relational_character_block describing character_no of the related character, relational_material_block describing material_no of the related material, relational_company_block describing compnay_no of the related company, relational_text_block describing text_no of the related text, relational_picture_block describing picture_no of the related picture, relational_sound_block describing sound_no of the related sound, and relational_movie_block describing movie_no of the related movie.

The movie_data_element composing the EPG_contents_data is composed of movie_no_block describing the ID allocated in unit of movie, movie_name_block describing the name of the movie, movie_format_block describing the format ID of the movie, relational_program_no_block describing program_no of the related program, relational_character_block describing character_no of the related character, relational_material_block describing material_no of the related material, relational_company_block describing compnay_no of the related company, relational_text_ block describing text_no of the related text, relational_picture_block describing picture_no of the related picture, relational_sound_block describing sound_no of the related sound, and relational_movie_block describing movie_no of the related movie.

FIG. 38 shows the detailed structural example of the EPG_control_data in the EPG_data shown in FIG. 16. As shown in the figure, main_layout_element composing the EPG_control_data is composed of page_no_block describing ID allocated in unit of page to be displayed, page_name_block describing the name of the page, page_position_ block describing position where the page is displayed and compose_box_block describing box_no of a box composing the page.

The box_layout_element composing the EPG_control_data is composed of box_no_block describing ID allocated in unit of box, box_name_block describing the name of the box, box_position_block describing position where the box is displayed and compose_cell_block describing cell_no of a cell composing the box.

The cell_layout_element composing the EPG_control_data is composed of cell_no_block describing ID allocated in unit of cell, cell_name_block describing the name of the cell, cell_position_block describing position where the cell is displayed, contents_element_block describing kinds of contents_element to be displayed in the cell and contents_id_block describing ID of the contents_element to be displayed in the cell.

Information for manipulating the main screen is described in the main_operation_element composing the EPG_control_data. Information for manipulating the box screen is described in the box_operation_element composing the EPG_control_data. Information for manipulating the cell screen is described in the cell_operation_element composing the EPG_control_data.

FIG. 39 shows a detailed structural example of list_management_element in the EPG_management_data in the EPG_data shown in FIG. 16. As shown in the figure, list_management_element is composed of ID allocated in unit of program list (list_no_block), the date of the program list (list_time_block), ID allocated in unit of program (event_no_block) and the date/time starting the program (onAir_time_block).

As described above, even when the same program is to be broadcasted by different broadcasting stations and different time as often seen in local districts and minor stations, the present embodiment allows the process thereof to be implemented efficiently by transmitting the EPG_contents_data corresponding to the respective cases. Further, even when the program is delayed or postponed by some reason, the present embodiment allows the process to be implemented efficiently by transmitting the corresponding EPG_contents_data.

Further, because the information concerning on the layout of the display screen of the EPG information is transmitted separately from the EPG information, the EPG information may be transmitted while giving consideration to the degree of freedom in changing the display format and the layout on the receiver side.

It is noted that the transmission media include network transmission media such as Internet and digital satellite, beside information recording media such as FD (floppy disc) and CD-ROM (compact disc-read only memory).

It is also noted that the digital TV described in the above-mentioned embodiment may be realized by using either satellite or ground wave.

While the preferred embodiment has been described, variations thereto will occur to those skilled in the art within the scope of the present inventive concepts which are delineated by the following claims.

What is claimed is:

1. A transmitter system for transmitting program related information relating to program information, comprising:
    generating means for generating said program related information and layout information relating to displaying said program related information; and
    transmitting means for transmitting said program related information and said layout information separately;
    whereby said layout information includes information for initiating an operation in response to selection of a displayed item; and
    whereby the displaying of said program related information includes partitioning a display space according to a hierarchical structure having at least three levels, a main page level, a box level and a cell level, wherein main pages are linked to boxes via main-box link information and boxes are linked to cells via box-cell link information; and
    whereby each main page is associated with a main layout tag that includes a display position for said page and an ID of a box composing the page, each box is associated with a box layout tag that includes a display position for said box and an ID of a cell composing the box, and each cell is associated with a cell layout tag That includes an ID of a data format of the cell, a display position of the cell, and one or more IDs of information related to the cell,
    wherein said program related information and said layout information are divided into a first part and a plurality of second parts,
    wherein each first part includes identification information for identifying the program related information or the display related layout information, and
    wherein the plurality of second parts are each composed of label data for identifying a type of block data, size data, and the block data, and
    wherein each of the plurality of second parts is further divided into a third part composed of identification information for identifying a type of second block data and second size data and a plurality of fourth parts composed the second block data.

2. A receiver system for receiving program related information relating to program information, comprising:
    receiving means for separately receiving said program related information and layout information relating to displaying said program related information,
    wherein said program related information and said layout information are divided into a first part that and a plurality of second parts, wherein each first part includes identification information for identifying the program related information or the display related layout information, and wherein the plurality of second parts are each composed of label data for identifying a type of block data, size data, and the block data, wherein each of the plurality of second parts is further divided into a third part composed of identification information for identifying a type of second block data and second size data and a plurality of fourth parts composed the second block data; and generating means for generating fourth information for displaying said program related information based on said program related information and said layout information;

whereby said layout information includes information for initiating an operation in response to selection of a displayed item; and whereby the displaying of said program related information includes partitioning a display space according to a hierarchical structure having at least three levels, a main page level, a box level and a cell level, wherein main pages are linked to boxes via main-box link information and boxes are linked to cells via box-cell link information; and whereby each main page is associated with a main layout tag that includes a display position for said page and an ID of a box composing the page, each box is associated with a box layout tag that includes a display position for said box and an ID of a cell composing the box, and each cell is associated with a cell layout tag that includes an ID of a data format of the cell, a display position of the cell, and one or more IDs of information related to the cell.

3. The receiver system according to claim 2, further comprising:

first separating means for separating said program related information and said layout information into a first part containing identification information for identifying said program related information and said layout information and a second part composed of actual data;

second separating means for separating said second part into a third part comprising identification information for identifying said second part and a fourth part composed of actual data; and retrieving means for retrieving data of said second part and said fourth part of said program related information and said layout information based on said identification information.

4. The receiver system according to claim 3, further comprising updating means for updating said second part and said fourth part of said program related information and said layout information based on said identification information.

5. The receiver system according to claim 3, further comprising display control means for displaying a first window on a predetermined screen and displaying data of said fourth part within said first window.

6. The receiver system according to claim 3, wherein a first window is composed of one or more boxes.

7. The receiver system according to claim 2, further comprising second generating means for generating fifth information from said program related information and said layout information.

8. A transmitting method for transmitting program related information relating to program information, comprising the steps of:

generating said program related information and layout information relating to displaying said program related information; and transmitting said program related information and said layout information separately;

said generating step composing said program related information and said layout information, wherein said program related information and said layout information are divided into a first part and a plurality of second parts, wherein each first part includes identification information for identifying the program related information or the display related layout information, and wherein the plurality of second parts are each composed of label data for identifying a type of block data, size data, and the block data, wherein each of the plurality of second parts is further divided into a third part composed of identification information for identifying a type of second block data and second size data and a plurality of fourth parts composed the second block data;

whereby said layout information includes information for initiating an operation in response to selection of a displayed item; and whereby the displaying of said program related information includes partitioning a display space according to a hierarchical structure having at least three levels, a main page level, a box level and a cell level, wherein main pages are linked to boxes via main-box link information and boxes are linked to cells via box-cell link information; and whereby each main page is associated with a main layout tag that includes a display position for said page and an ID of a box composing the page, each box is associated with a box layout tag that includes a display position for said box and an ID of a cell composing the box, and each cell is associated with a cell layout tag that includes an ID of a data format of the cell, a display position of the cell, and one or more IDs of information related to the cell.

9. A receiving method for receiving program related information relating to program information, comprising the steps of:

receiving separately said program related information and layout information relating to displaying said program related information, wherein said program related information and said layout information are each divided into a first part and a plurality of second parts, wherein each first part includes identification information for identifying the program related information or the display related layout information, and wherein the plurality of second parts are each composed of label data for identifying a type of block data, size data, and the block data, wherein each of the plurality of second parts is further divided into a third part composed of identification information for identifying a type of second block data and second size data and a plurality of fourth parts composed the second block data; and generating fourth information for displaying said program related information based on said program related information and said layout information;

whereby said layout information includes information for initiating an operation in response to selection of a displayed item; and whereby the displaying of said program related information includes partitioning a display space according to a hierarchical structure having at least three levels, a main page level, a box level and a cell level, wherein main pages are linked to boxes via main-box link information and boxes are linked to cells via box-cell link information; and whereby each main page is associated with a main layout tag that includes a display position for said page and an ID of a box composing the page, each box is associated with a box layout tag that includes a display position for said box and an ID of a cell composing the box, and each cell is associated with a cell layout tag that includes an ID of a data format of the cell, a display position of the cell, and one or more IDs of information related to the cell.

10. The receiving method according to claim 9, further comprising a second generating step for generating fifth information from said program related information and said layout information.

* * * * *